(12) United States Patent
Naruse

(10) Patent No.: US 10,883,887 B2
(45) Date of Patent: Jan. 5, 2021

(54) PHYSICAL QUANTITY SENSOR HAVING A SPRING CONNECTED TO A MOVABLE UNIT

(71) Applicant: Seiko Epson Corporation, Tokyo (JP)

(72) Inventor: Atsuki Naruse, Shiojiri (JP)

(73) Assignee: Seiko Epson Corporation

( * ) Notice: Subject to any disclaimer, the term of this patent is extended or adjusted under 35 U.S.C. 154(b) by 176 days.

(21) Appl. No.: 16/162,684

(22) Filed: Oct. 17, 2018

(65) Prior Publication Data

US 2019/0113401 A1 Apr. 18, 2019

(30) Foreign Application Priority Data

Oct. 18, 2017 (JP) .................... 2017-201612

(51) Int. Cl.
| | |
|---|---|
| *G01L 1/14* | (2006.01) |
| *G01D 5/24* | (2006.01) |
| *G01P 15/18* | (2013.01) |
| *G01P 15/125* | (2006.01) |
| *G01P 15/08* | (2006.01) |

(52) U.S. Cl.
CPC ................ *G01L 1/144* (2013.01); *G01D 5/24* (2013.01); *G01P 15/125* (2013.01); *G01P 15/18* (2013.01); *G01P 15/0802* (2013.01); *G01P 2015/0814* (2013.01); *G01P 2015/0854* (2013.01)

(58) Field of Classification Search
CPC ... G01L 19/003; G01L 19/147; G01L 19/141; G01L 19/148; G01L 19/0038; G01L 27/005; G01L 19/0627; Y10T 29/49103; Y10T 29/49774; Y10T 29/49927; Y10T 29/49918; B81B 2201/0264; B81C 1/0023
See application file for complete search history.

(56) References Cited

U.S. PATENT DOCUMENTS

| | | | | |
|---|---|---|---|---|
| 7,258,011 | B2* | 8/2007 | Nasiri | G01P 1/023 |
| | | | | 73/510 |
| 8,205,498 | B2* | 6/2012 | Hsu | G01P 15/125 |
| | | | | 73/514.32 |
| 2009/0199637 | A1* | 8/2009 | Sugiura | G01P 15/125 |
| | | | | 73/514.32 |

FOREIGN PATENT DOCUMENTS

JP 2008-039595 A 2/2008

* cited by examiner

*Primary Examiner* — Brandi N Hopkins
(74) *Attorney, Agent, or Firm* — Harness, Dickey & Pierce, P.L.C.

(57) ABSTRACT

A physical quantity sensor includes a base unit as a support substrate, provided with a cavity that is open on one side, a movable unit which is formed on an open side of the cavity and is capable of displacing in a first direction, and spring units that are formed on the open side of the cavity and are connected to the movable unit. A length of the spring units in a second direction that is a direction, which intersects the first direction and in which the base unit overlaps the movable unit, is shorter than a length of the movable unit in the second direction and is longer than a length of the spring units in the first direction.

20 Claims, 21 Drawing Sheets

PHYSICAL QUANTITY SENSOR HAVING A SPRING CONNECTED TO A MOVABLE UNIT

CROSS-REFERENCE TO RELATED APPLICATION

This nonprovisional application claims the benefit of Japanese Patent Application No. 2017-201612 filed Oct. 18, 2017, the enter disclosure which is incorporated herein by reference.

BACKGROUND

1. Technical Field

The present invention relates to a physical quantity sensor, an electronic apparatus, and a vehicle.

2. Related Art

In recent years, there has been developed a physical quantity sensor manufactured by using a silicon micro-electro-mechanical system (MEMS). For example, JP-A-2008-39595 discloses, as the physical quantity sensor, an electrostatic capacitance-type acceleration sensor that includes an element having a movable electrode and a fixed electrode which are disposed to be opposite to each other in a comb-teeth shape, in which an acceleration (physical quantity) is applied to the movable electrode, and thereby a gap between the movable electrode and the fixed electrode changes such that the acceleration is measured based on electrostatic capacitance between the two electrodes. In the acceleration sensor, the movable electrode and the fixed electrode are formed of a silicon substrate, instead of a movable electrode and a fixed electrode which are formed of a silicon thin film in the related art. Therefore, comb teeth of the movable electrode or the fixed electrode can have a large thickness, electrostatic capacitance between the two electrodes increases, and thus it is possible to obtain high measurement sensitivity.

However, in the acceleration sensor (physical quantity sensor) disclosed in JP-A-2008-39595, a movable electrode and a fixed electrode of a bulk type, which are formed of a silicon substrate, are used. Therefore, it is possible to increase a plate thickness, and it is possible to increase an opposite area; however, squeezed film damping (flow resistance of gas between electrodes) occurring because of a small gap between the movable electrode and the fixed electrode, which is a factor of noise, remarkably increases. Therefore, a problem arises in that it is difficult to reduce noise while the measurement sensitivity is increased.

SUMMARY

An advantage of some aspects of the invention is to solve at least a part of the problems described above, and the invention can be implemented as the following forms or application examples.

APPLICATION EXAMPLE 1

A physical quantity sensor according to this application example includes: a support substrate provided with a cavity that is open on one side; a movable unit that is formed on an open side of the cavity and is capable of displacing in a first direction; and a spring unit that is formed on the open side of the cavity and is connected to the movable unit. A length of the spring unit in a second direction that is a direction, which intersects the first direction and in which the support substrate overlaps the movable unit, is shorter than a length of the movable unit in the second direction and is longer than a length of the spring unit in the first direction.

According to this application example, the length of the spring unit connected to the movable unit in the second direction is shorter than the length of the movable unit in the second direction and is longer than the length of the spring unit in the first direction. Therefore, it is possible to more weaken stiffness of the spring unit while a spring property of the spring unit in the first direction is maintained as is, compared to a case where the length of the spring unit in the second direction is equal to the length of the movable unit in the second direction. Therefore, since it is possible to increase an amount of displacement of the movable unit in the first direction, and it is possible to increase an amount of change in electrostatic capacitance between electrodes, it is possible to obtain high measurement sensitivity. Since the amount of displacement of the movable unit increases, it is possible to widen a gap between the electrodes. Therefore, it is possible to decrease squeezed film damping, and it is possible to reduce noise due to the squeezed film damping. Hence, it is possible to obtain the physical quantity sensor that has the high measurement sensitivity, small noise due to a damping effect, and a good S/N characteristic.

APPLICATION EXAMPLE 2

In the physical quantity sensor according to the application example, it is preferable that a length between the spring unit and the support substrate in the second direction is longer than a length between the movable unit and the support substrate in the second direction.

According to this application example, the length between the spring unit and the support substrate in the second direction is longer than the length between the movable unit and the support substrate in the second direction. Therefore, it is possible to decrease slide film damping occurring between the spring unit and the support substrate, and it is possible to reduce noise due to the slide film damping.

APPLICATION EXAMPLE 3

In the physical quantity sensor according to the application example, it is preferable that a length between a surface of the spring unit on a side opposite to a surface of the spring unit on a side of the support substrate and the support substrate in the second direction is shorter than a length between a surface of the movable unit on a side opposite to a surface of the movable unit on a side of the support substrate and the support substrate in the second direction.

According to this application example, the length between the surface of the spring unit on a side opposite to the surface of the spring unit on the side of the support substrate and the support substrate in the second direction is shorter than the length between the surface of the movable unit on the side opposite to the surface of the movable unit on the side of the support substrate and the support substrate in the second direction. Therefore, when the spring unit and the movable unit are formed, it is possible to form the spring unit and the movable unit from the surfaces on the sides opposite to the surface of the support substrate by a photolithography technology through an etching process, and thus it is easy to manufacture the units.

APPLICATION EXAMPLE 4

In the physical quantity sensor according to the application example, it is preferable that a length between a gravity center of the spring unit and the support substrate in the second direction is equal to a length between a gravity center of the movable unit and the support substrate in the second direction.

According to this application example, the length between the gravity center of the spring unit and the support substrate in the second direction is equal to the length between the gravity center of the movable unit and the support substrate in the second direction. Therefore, when the spring unit is bent, it is possible to displace the movable unit in the first direction in a state in which the surfaces of the spring unit and the movable unit, which are opposite to each other, are parallel to each other.

APPLICATION EXAMPLE 5

In the physical quantity sensor according to the application example, it is preferable that a length between a surface of the spring unit on a side opposite to a surface of the spring unit on a side of the support substrate and the support substrate in the second direction is equal to a length between a surface of the movable unit on a side opposite to a surface of the movable unit on a side of the support substrate and the support substrate in the second direction.

According to this application example, the length between the surface of the spring unit on the side opposite to the surface of the spring unit on the side of the support substrate and the support substrate in the second direction is equal to the length between the surface of the movable unit on the side opposite to the surface of the movable unit on the side of the support substrate and the support substrate in the second direction. Therefore, when the spring unit and the movable unit are formed, the surfaces of the units, which are opposite to the surfaces thereof on the side of the support substrate are flat. Thus, it is possible to obtain high patterning accuracy by the photolithography technology, and it is possible to improve dimension accuracy of the spring unit and the movable unit.

APPLICATION EXAMPLE 6

In the physical quantity sensor according to the application example, it is preferable that in a part of the spring unit, the length of the spring unit in the second direction is shorter than the length of the movable unit in the second direction.

According to this application example, the length of the spring unit in the second direction is shorter than the length of the movable unit in the second direction in a part of the spring unit. Therefore, it is possible to more weaken the stiffness of the spring unit, compared to a case where the length of the spring unit in the second direction is equal to the length of the movable unit in the second direction. Therefore, since it is possible to increase the amount of displacement of the movable unit in the first direction, and it is possible to increase the amount of change in electrostatic capacitance between electrodes, it is possible to obtain high measurement sensitivity.

APPLICATION EXAMPLE 7

An electronic apparatus according to this application example includes the physical quantity sensor according to the application examples described above.

According to this application example, it is possible to obtain the effects of the above-described physical quantity sensor, and thus it is possible to obtain the electronic apparatus with high reliability.

APPLICATION EXAMPLE 8

A vehicle according to this application example includes the physical quantity sensor according to the application examples described above.

According to this application example, it is possible to obtain the effects of the above-described physical quantity sensor, and thus it is possible to obtain the vehicle with high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, an electronic apparatus, and a vehicle according to the invention will be described in detail according to embodiments illustrated in the appended drawings. The embodiments to be described below do not unreasonably limit content of the invention to be described in the appended claims. The configuration to be described in the embodiment is not entirely an essential configurational requirement of the invention.

Physical Quantity Sensor

First Embodiment

Figure 1:
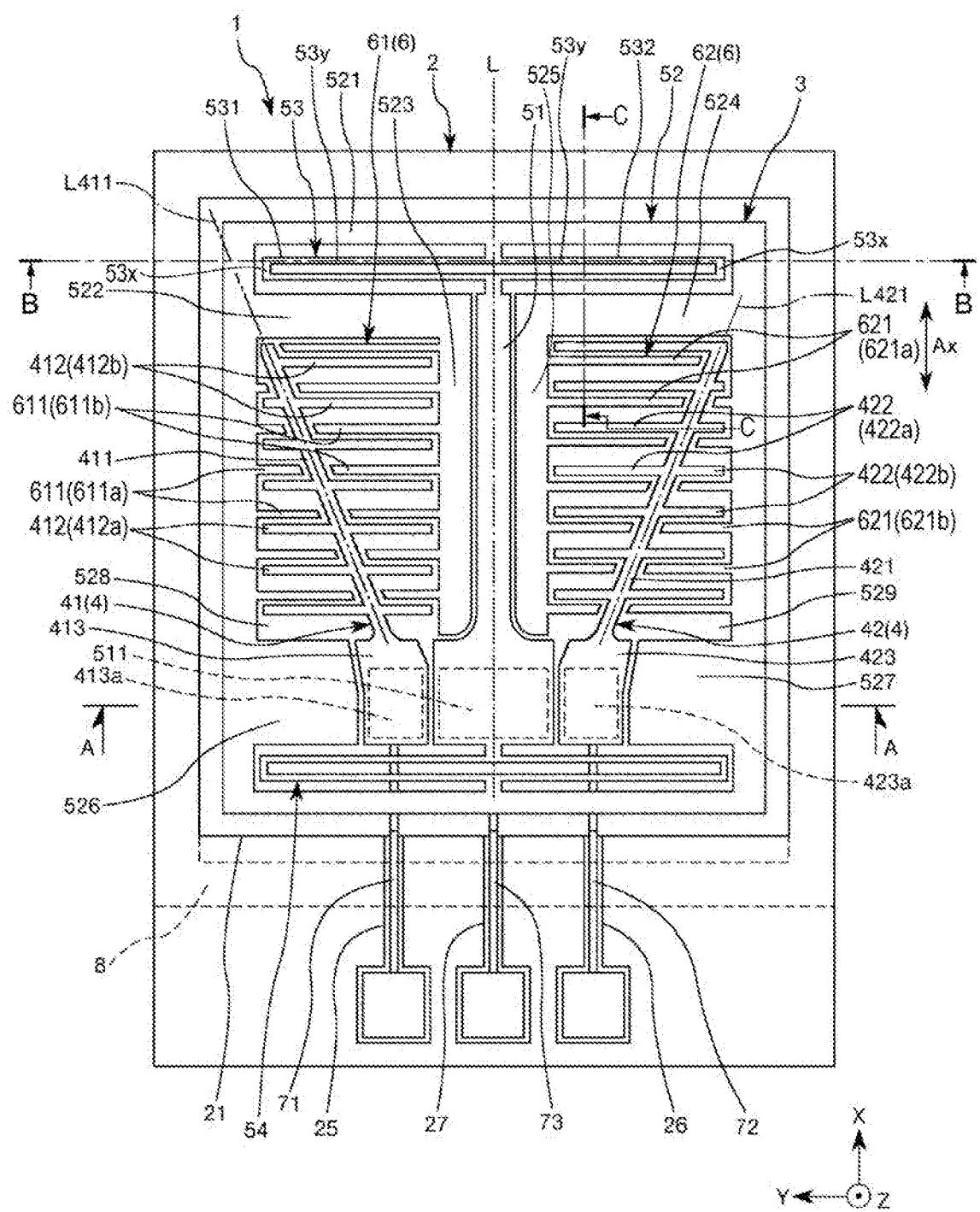
FIG. 1 is a plan view illustrating a physical quantity sensor according to a first embodiment of the invention.
Figure 2:
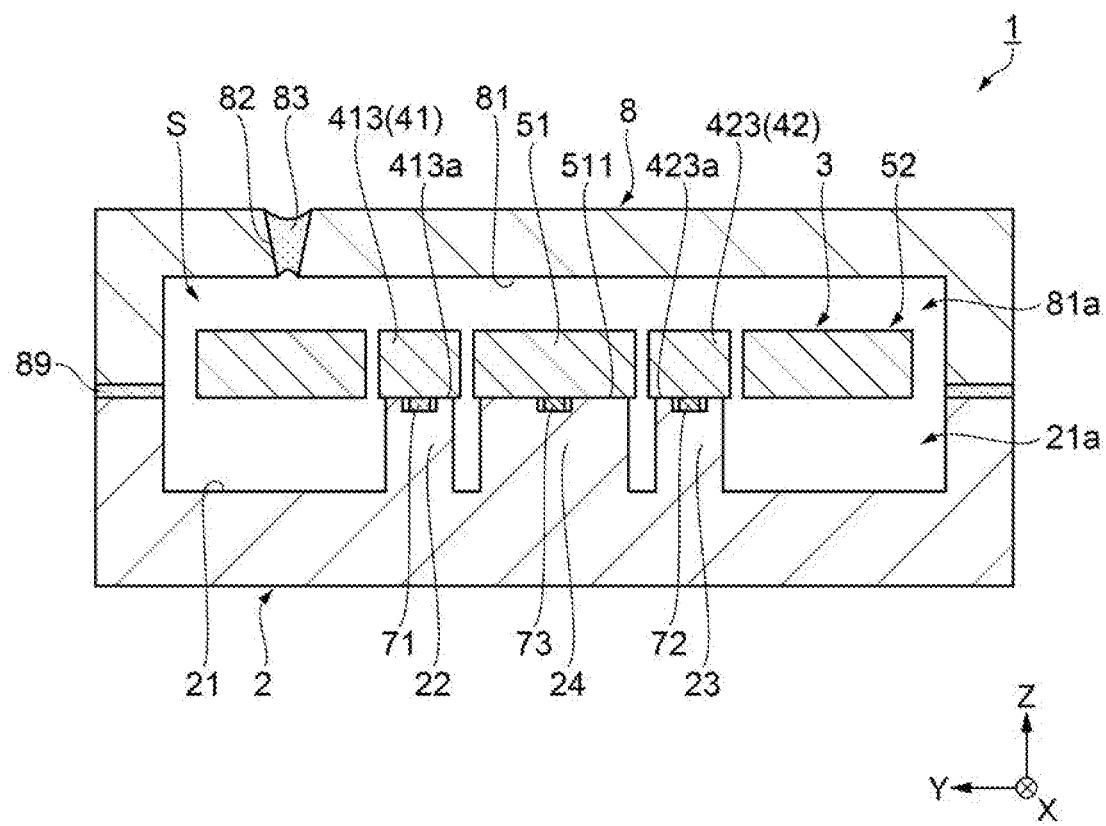
FIG. 2 is a sectional view taken along line A-A of FIG. 1.
Figure 3:
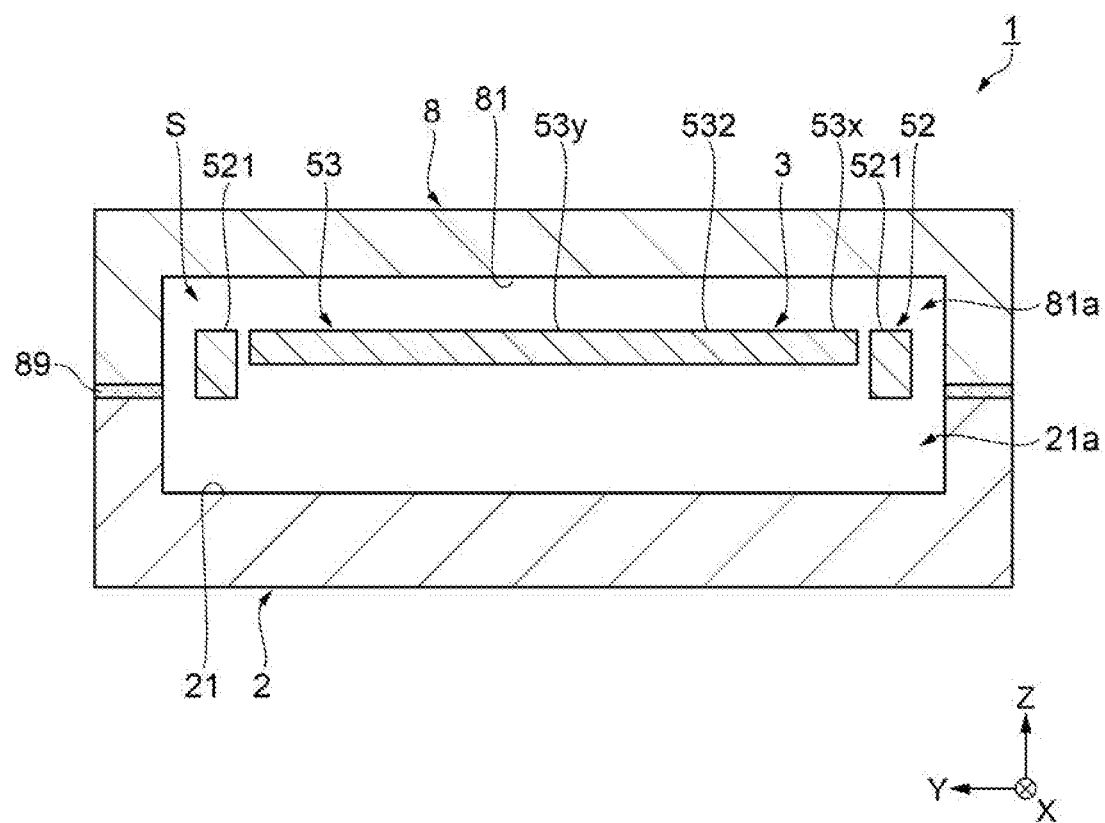
FIG. 3 is a sectional view taken along line B-B of FIG. 1.
Figure 4:
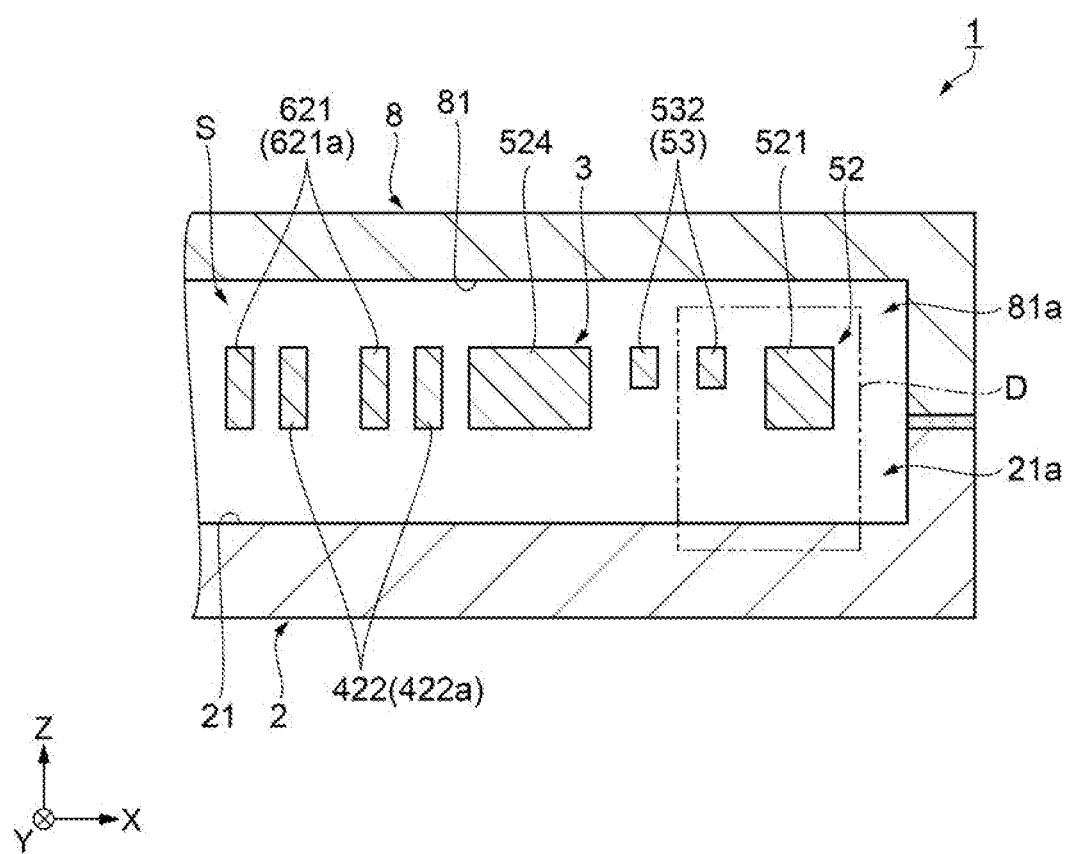
FIG. 4 is a sectional view taken along line C-C of FIG. 1.
Figure 5:
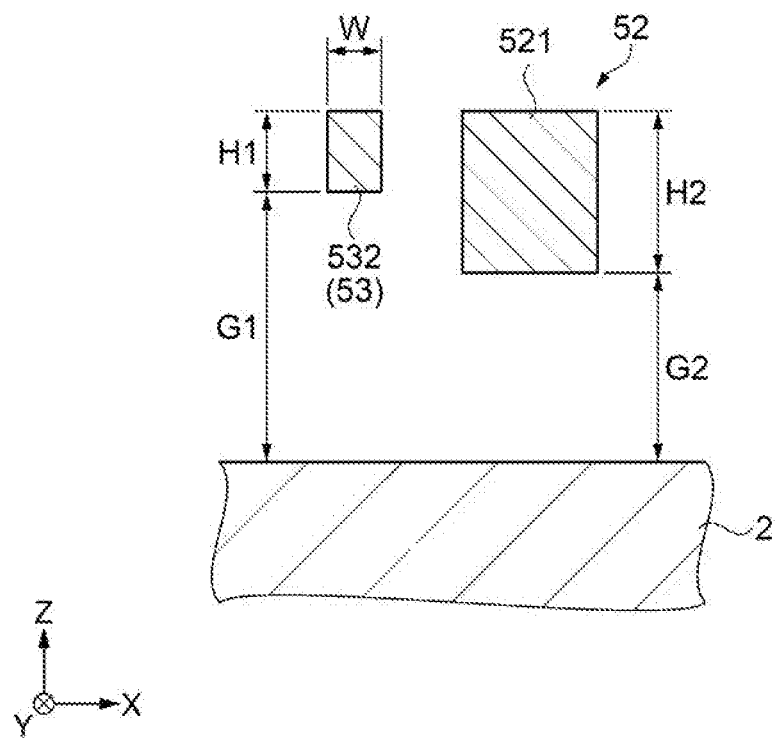
FIG. 5 is an enlarged sectional view of portion D of FIG. 4.

First, a physical quantity sensor 1 according to a first embodiment of the invention will be described with reference to FIGS. 1 to 5. FIG. 1 is a plan view illustrating a physical quantity sensor according to the first embodiment of the invention. FIG. 2 is a sectional view taken along the line A-A of FIG. 1. FIG. 3 is a sectional view taken along line B-B in FIG. 1. FIG. 4 is a sectional view taken along line C-C of FIG. 1. FIG. 5 is an enlarged sectional view of portion D of FIG. 4. Hereinafter, to facilitate description, the front side of the sheet surface in FIG. 1 and the upper side in FIGS. 2 to 5 are referred to as a "top" and the rear side of the sheet surface in FIG. 1 and the lower side in FIGS. 2 to 5 are referred to as a "bottom". As illustrated in FIGS. 1 to 5 and FIGS. 7A to 10, three axes perpendicular to each other are referred to as the X, Y, and Z axes. A direction parallel to the X axis is also referred to as an "X axis direction" or a "first direction", a direction parallel to the Y axis is also referred to as a "Y axis direction", and a direction parallel to the Z axis is also referred to as a "Z axis direction" or a "second direction". The front end side of the arrow direction on each axis is referred to as a "positive side" and an opposite side is also referred to as a "negative side".

A physical quantity sensor 1 illustrated in FIG. 1 is an acceleration sensor capable of measuring acceleration Ax in the X axis direction, which is the first direction. The physical quantity sensor 1 includes a base unit 2 and an element unit 3 that is installed in the base unit 2 and measures the acceleration Ax (physical quantity) in the X axis direction. The element unit 3 includes a fixed electrode unit 4 fixed to the base unit 2, a movable unit 52 that is capable of displacing with respect to the base unit 2 in the X axis direction (first direction, which is a measurement axis direction of the physical quantity), and a movable electrode unit 6 installed in the movable unit 52. The movable electrode unit 4 includes a first fixed electrode unit 41 and a second fixed electrode unit 42 disposed beside each other in the Y axis direction. The first fixed electrode unit 41 includes a first stem 411 and a plurality of first fixed electrode fingers 412 that extend from the first stem 411 on both sides of the Y axis direction. The second fixed electrode unit 42 includes a second stem 421 and a plurality of second fixed electrode fingers 422 that extend from the second stem 421 on both sides of the Y axis direction. The movable electrode unit 6 includes a first movable electrode unit 61 and a second movable electrode unit 62 disposed beside each other in the Y axis direction. At least a part of the first movable electrode unit 61 is positioned on both sides of the first stem 411 in the Y axis direction and includes a plurality of first movable electrode fingers 611 that are opposite to the first fixed electrode fingers 412 in the X axis direction. At least a part of the second movable electrode unit 62 is positioned on both sides of the second stem 421 in the Y axis direction and includes a plurality of second movable electrode fingers 621 that are opposite to the second fixed electrode fingers 422 in the X axis direction. In such a configuration, while sufficiently high electrostatic capacitance is maintained between the first movable electrode fingers 611 and the first fixed electrode fingers 412 and sufficiently high electrostatic capacitance is maintained between the second movable electrode fingers 621 and the second fixed electrode fingers 422, it is possible to shorten each of the first fixed electrode fingers 412, the second fixed electrode fingers 422, the first movable electrode fingers 611, and the second movable electrode fingers 621. Therefore, damage to the electrode fingers 412, 422, 611, and 621 is unlikely occur, and thus the physical quantity sensor 1 having good shock resistance is realized. Hereinafter, the physical quantity sensor 1 will be described in detail.

As illustrated in FIG. 1, the physical quantity sensor 1 includes the base unit 2, the element unit 3 disposed on the base unit 2, and a lid 8 bonded to the base unit 2 so as to cover the element unit 3.

Base Unit

As illustrated in FIG. 1, the base unit 2 is formed in a plate form with a rectangular shape in a plan view. The base unit 2 includes a recess 21 that is open on an upper surface side. In a plan view in the Z axis direction, the recess 21 is formed to be larger than the element unit 3 so as to contain the element unit 3 on the inner side. The recess 21 functions as a clearance portion for preventing contact between the element unit 3 and the base unit 2.

As illustrated in FIG. 2, the base unit 2 includes a cavity 21a configured in the recess 21 and mount units 22, 23, and 24 having three projection shapes installed on a bottom surface of the recess 21. The first fixed electrode unit 41 is bonded to the mount unit 22, the second fixed electrode unit 42 is bonded to the mount unit 23, and a movable unit support unit 51 is bonded to the mount unit 24.

As illustrated in FIG. 1, the base unit 2 includes grooves 25, 26, and 27 that are open on the upper surface side. One end of each of the grooves 25, 26, and 27 is located outside the lid 8 and the other end of each of the grooves 25, 26, and 27 is connected to the recess 21.

As the foregoing base unit 2, for example, a glass substrate formed of a glass material (for example, borosilicate glass such as pyrex (registered trademark) glass) that contains alkali metal ions (movable ions) can be used. Consequently, for example, depending on a constituent material of the lid 8, the base unit 2 and the lid 8 can be bonded by anodic bonding. Thus, the base unit 2 and the lid 8 can be bonded rigidly. Since the base unit 2 with optical transparency can be obtained, a state of the element unit 3 can be viewed through the base unit 2 from the outside of the physical quantity sensor 1.

Here, the base unit 2 is not limited to a glass substrate. For example, a silicon substrate or a ceramics substrate may be used. When a silicon substrate is used, it is preferable to use a silicon substrate with high resistance or to use a silicon substrate in which a silicon oxide film (insulation oxide) is formed on the surface by thermal oxidation from the viewpoint of preventing short-circuiting.

As illustrated in FIG. 1, wirings 71, 72, and 73 are installed in the grooves 25, 26, and 27, respectively. One end of the wiring 71 in the groove 25 is exposed outside the lid 8 and functions as a terminal electrically connected to an external apparatus. As illustrated in FIG. 2, the other end of the wiring 71 is extracted to the mount unit via the recess 21. The wiring 71 is electrically connected to the first fixed electrode unit 41 on the mount unit 22.

As illustrated in FIG. 1, one end of the wiring in the groove 26 is exposed outside the lid 8 and functions as a terminal electrically connected to an external apparatus. As illustrated in FIG. 2, the other end of the wiring 72 is extracted to the mount unit 23 via the recess 21. The wiring 72 is electrically connected to the second fixed electrode unit 42 on the mount unit 23.

As illustrated in FIG. 1, one end of the wiring in the groove 27 is exposed outside the lid 8 and functions as a terminal electrically connected to an external apparatus. As illustrated in FIG. 2, the other end of the wiring 73 is extracted to the mount unit 24 via the recess 21. The wiring 73 is electrically connected to the movable unit support unit 51 on the mount unit 24.

A constituent material of the wirings 71, 72, and is not particularly limited. For example, a metal material such as gold (Au), silver (Ag), platinum (Pt), palladium (Pd), iridium (Ir), copper (Cu), aluminum (Al), nickel (Ni), a titanium (Ti), or tungsten (W), an alloy containing such a metal material, or an oxide-based transparent conductive material such as indium tin oxide (ITO), indium zinc oxide (IZO), ZnO, or IGZO can be exemplified. One or two or more thereof can be combined to be used (for example, as a stacked body of two or more layers).

Lid

As illustrated in FIG. 1, the lid 8 is formed in a plate form with a rectangular shape in a plan view. As illustrated in FIG. 2, the lid 8 includes a recess 81 that is open on a lower surface side. The lid 8 is bonded to the base unit 2 so that the element unit 3 is accommodated inside a cavity 81*a* configured in the recess 81. The cavity 81*a* configured in the recess 81 of the lid 8 and the cavity 21*a* configured in the recess 21 of the base unit 2 form an accommodation space S in which the element unit 3 is accommodated.

As illustrated in FIG. 2, the lid 8 includes a communication hole 82 communicating with the inside and the outside of the accommodation space S. Thus, the atmosphere in the accommodation space S can be replaced with a desired atmosphere via the communication hole 82. A sealing member is disposed in the communication hole 82 and the communication hole 82 is sealed by the sealing member 83.

The sealing member 83 is not particularly limited as long as the communication hole 82 can be sealed. For example, any of various alloys such as a gold (Au)/tin (Sn)-based alloy, a gold (Au)/germanium (Ge)-based alloy, and a gold (Au)/aluminum (Al)-based alloy or a glass material such as low-melting point glass can be used.

The accommodation space S seals an inert gas such as nitrogen, helium, or argon and is preferably nearly in an atmospheric pressure at a use temperature (about −40° C. to 80° C.). When the accommodation space S is in the atmospheric pressure, viscous resistance increases, and thus a damping effect is exerted. Therefore, vibration of the movable unit 52 can converge (stop) quickly. Therefore, measurement accuracy of the acceleration Ax of the physical quantity sensor 1 is improved.

In the embodiment, the lid 8 is configured as a silicon substrate. Here, the lid 8 is not limited to a silicon substrate. For example, a glass substrate or a ceramics substrate may be used. A method of bonding the base unit 2 to the lid 8 is not particularly limited and may be appropriately selected depending on the materials of the base unit 2 and the lid 8. For example, anodic bonding, activation bonding in which bonding surfaces activated by plasma irradiation are bonded, bonding in which a bonding material such as a glass frit is used, and diffusion bonding, in which metal films formed on the upper surface of the base unit 2 and the lower surface of the lid 8 are bonded, can be exemplified.

In the embodiment, as illustrated in FIG. 2, the base unit 2 and the lid 8 are bonded with a glass frit 89 (low-melting point glass), which is an example of a bonding material, interposed therebetween. In a state in which the base unit 2 and the lid 8 overlap each other, the inside and the outside of the accommodation space S communicate with each other via the grooves 25, 26, and 27. However, by using the glass frit 89, it is possible to bond the base unit 2 to the lid 8 and seal the grooves 25, 26, and 27. Thus, it is easier to achieve airtight sealing of the accommodation space S. When the base unit 2 and the lid 8 are bonded by anodic bonding or the like (a bonding method in which the grooves 25, 26, and 27 may not be sealed), the grooves 25, 26, and 27 can be blocked by an $SiO_2$ film formed by a CVD method, for example, using tetraethoxysilane (TEOS).

Element Unit

As illustrated in FIG. 1, the element unit 3 includes the fixed electrode unit 4 fixed to the base unit 2, the movable unit support unit 51 fixed to the base unit 2, the movable unit 52 capable of displacing with respect to the movable unit support unit 51 in the X axis direction, the spring units 53 and 54 connecting the movable unit support unit 51 and the movable unit 52, and the movable electrode unit 6 installed in the movable unit 52. Of the units, the movable unit support unit 51, the movable unit 52, the spring units 53 and 54, and the movable electrode unit 6 are formed to be integrated and are disposed on an open side of the cavity 21*a* that is configured in the recess 21 installed in the base unit 2 and is open on one side. The element unit 3 can be formed, for example, by patterning a silicon substrate doped with impurities such as phosphorus (P) or boron (B). The element unit 3 is bonded to the base unit 2 (the mount units 22, 23, and 24) by anodic bonding. Here, the material of the element unit 3 or the method of bonding of the element unit 3 to the base unit 2 is not particularly limited.

As illustrated in FIG. 1, the movable unit support unit 51 is formed in a longitudinal shape extending in the X axis direction. The movable unit support unit 51 has a bond portion 511 that is bonded to the mount unit 24 at an end of the support unit on the negative side of the X axis direction. In the embodiment, the movable unit support unit 51 is formed in the longitudinal shape extending in the X axis direction; however, the shape of the movable unit support unit 51 is not particularly limited as long as the movable unit support unit exhibits its function. Hereinafter, in a plan view in the Z axis direction, an imaginary axis bisecting the movable unit support unit 51 in the Y axis direction is assumed to be a central axis L.

The movable unit support unit 51 is located between the first fixed electrode unit 41 and the second fixed electrode unit 42. Thus, it is possible to dispose the movable unit support unit 51 at a center portion of the movable unit 52, and thus it is possible to more stably support the movable unit 52.

As illustrated in FIG. 1, the movable unit 52 is formed in a frame shape in a plan view in the Z axis direction and surrounds the movable unit support unit 51, the spring units 53 and 54, the first fixed electrode unit 41, and the second fixed electrode unit 42. That is, the movable unit 52 is formed in a frame shape that surrounds the fixed electrode unit 4. Thus, it is possible to increase the mass of the movable unit 52. Therefore, it is possible to more improve sensitivity and measure a physical quantity with higher accuracy.

The movable unit 52 includes a first opening 528 (first notch portion) inside which the first fixed electrode unit 41 is disposed and a second opening 529 (second notch portion) inside which the second fixed electrode unit 42 is disposed. The first opening 528 and the second opening 529 are disposed side by side in the Y axis direction. The movable unit 52 is symmetrical to the central axis L.

The shape of the movable unit 52 will be described in more detail. The movable unit 52 includes a frame 521 that surrounds the movable unit support unit 51, the spring units 53 and 54, the first fixed electrode unit 41, and the second fixed electrode unit 42; a first Y axis extension portion 522 that is located with respect to the first opening 528 on the positive side of the X axis direction and extends from the frame 521 on the negative side of the Y axis direction; a first X axis extension portion 523 that extends from the front end of the first Y axis extension portion 522 on the negative side of the X axis direction; a second Y axis extension portion 524 that is located with respect to the second opening 529 on the positive side of the X axis direction and extends from the frame 521 on the positive side of the Y axis direction; and a second X axis extension portion 525 that extends from the front end of the second Y axis extension portion 524 on the negative side of the X axis direction. The first Y axis extension portion 522 and the second Y axis extension portion 524 are installed near the spring unit 53 and are disposed along the spring unit 53 in the Y axis direction (extension direction of a spring piece 531). The first X axis extension portion 523 and the second X axis extension portion 525 are installed near the movable unit support unit 51 and are disposed along the movable unit support unit 51.

In such a configuration, the first Y axis extension portion 522 and the first X axis extension portion 523 function as support portions that support the first movable electrode fingers 611, and the second Y axis extension portion 524 and the second X axis extension portion 525 function as support portions that support the second movable electrode fingers 621.

The movable unit 52 includes a first protrusion portion 526 that protrudes from the frame 521 in the first opening 528 to be buried in a remaining space of the first opening 528 and a second protrusion portion 527 that protrudes from the frame 521 in the second opening 529 to be buried in a remaining space of the second opening 529. In this way, by installing the first protrusion portion 526 and the second protrusion portion 527, it is possible to further increase the mass of the movable unit 52 without increasing the size of the movable unit 52. Therefore, it is possible to more improve the sensitivity, and thus the physical quantity sensor 1 with higher sensitivity is realized.

Next, the spring units 53 and 54 are elastically deformable, and the spring units 53 and 54 elastically deform. In this manner, the movable unit 52 can be displaced with respect to the movable unit support unit 51 in the X axis direction. As illustrated in FIG. 1, the spring unit 53 connects the end of the movable unit 52 on the positive side of the X axis direction to the end of the movable unit support unit 51 on the positive side of the X axis direction. The spring unit 54 connects the end of the movable unit 52 on the negative side of the X axis direction to the end of the movable unit support unit 51 on the negative side of the X axis direction. Thus, since the movable unit 52 can be supported on both sides of the X axis direction, an attitude and a behavior of the movable unit 52 are stabilized. Therefore, it is possible to reduce unnecessary vibration and measure the acceleration Ax with higher accuracy.

The spring unit 53 includes a pair of spring pieces 531 and 532 disposed side by side in the Y axis direction. The pair of spring pieces 531 and 532 is each formed in a meandering shape in the Y axis direction and is formed to be symmetrical to each other with respect to the central axis L. The spring unit 53 is provided with a portion 53$y$ that extends to be long in the Y axis direction and a portion 53$x$ that extends to be short in the X axis direction. A configuration of the spring unit 53 is the same as a configuration of the spring unit 54.

In this way, the spring units 53 and 54 are formed to be longer in the Y axis direction perpendicular to the X axis than on the X axis, which is the measurement axis, and thereby it is possible to suppress displacement (particularly, rotation displacement around the Z axis) of the movable unit 52 in directions other than the X axis direction (measurement axis direction) when the acceleration Ax is applied. Therefore, it is possible to reduce unnecessary vibration and measure the acceleration Ax with higher accuracy.

As illustrated in FIGS. 3 to 5, the spring unit is smaller than that of the movable unit 52, which includes the frame 521 and the movable electrode fingers 621, in plate thickness (a length in the Z axis direction (second direction which is a direction intersecting the first direction and a direction in which the base unit 2 overlaps the movable unit 52)). In other words, a length H1 of the spring unit 53 in the Z axis direction is shorter than a length H2 of the movable unit 52 in the Z axis direction. Hence, it is possible to more weaken the stiffness of the spring unit 53, compared to a case where the spring unit 53 and the movable unit 52 have the same plate thickness. Therefore, since it is possible to increase an amount of displacement of the movable unit 52 in the X axis direction, and it is possible to increase the amount of change in electrostatic capacitance between the fixed electrode fingers 422 and the movable electrode fingers 621, it is possible to obtain high measurement sensitivity. Since the amount of displacement of the movable unit 52 increases, it is possible to widen a gap between the electrodes. Therefore, it is possible to decrease squeezed film damping (flow resistance of gas between electrodes), and it is possible to reduce noise due to the squeezed film damping.

The length H1 of the spring unit 53 in the Z axis direction is longer than a length W of the spring unit 53 in the X axis direction. Therefore, it is possible to maintain the spring property in the X axis direction while maintaining the stiffness in the Z axis direction.

A gap (length in the Z axis direction) between the spring unit 53 and the base unit 2 (a bottom surface of the recess 21) is larger than a gap between the movable unit 52 and the base unit 2. In other words, a length G1 between the spring unit 53 and the base unit 2 in the Z axis direction is longer than a length G2 between the movable unit 52 and the base unit 2 in the Z axis direction. Hence, since the spring unit 53 and the base unit 2 are separated from each other, it is possible to decrease the slide film damping occurring between the spring unit 53 and the base unit 2, and it is possible to reduce noise due to the slide film damping.

A gap (length in the Z axis direction) between a surface of the spring unit 53 on a side opposite to the base unit 2 and the base unit 2 (the bottom surface of the recess 21) is equal to a gap between a surface of the movable unit 52 on a side opposite to the base unit 2 and the base unit 2. In other words, a length (H1+G1) between a surface of the spring unit 53 on a side of the lid 8 and the base unit 2 in the Z axis direction is equal to a length (H2+G2) between the surface of the movable unit 52 on the side of the lid 8 and the base unit 2 in the Z axis direction. Hence, the surfaces of the spring unit 53 and the movable unit 52 on the side of the lid 8 are flat. Thus, when the element unit 3 is formed, it is possible to obtain high patterning accuracy by the photolithography technology, and it is possible to improve dimension accuracy of the element unit 3.

As described above, the configuration of the spring unit 53 is described, and the configuration of the spring unit 54 is the same as the configuration of the spring unit 53.

Next, as illustrated in FIG. 1, the fixed electrode unit 4 includes the first fixed electrode unit 41 located in the first opening 528 and the second fixed electrode unit 42 located in the second opening 529. The first fixed electrode unit 41 and the second fixed electrode unit 42 are disposed beside each other in the Y axis direction.

The first fixed electrode unit 41 includes a first stem support portion 413 that is fixed to the base unit 2, the first stem 411 that is supported by the first stem support portion 413, and the plurality of first fixed electrode fingers 412 that extend from the first stem 411 on both sides of the Y axis direction. The first stem support portion 413, the first stem 411, and the first fixed electrode fingers 412 are formed to be integrated.

The first stem support portion 413 includes a bond portion 413a bonded to the mount unit 22. The bond portion 413a is disposed to be close to the first stem support portion 413 on the negative side of the X axis direction.

Thus, the first stem 411 is formed in a rod-like longitudinal shape and one end of the first stem is connected to the first stem support portion 413. Thus, the first stem is supported by the first stem support portion 413. The first stem 411 extends in a direction inclined with respect to the X and Y axes in the plan view in the Z axis direction. More specifically, the first stem 411 is inclined so that a separate distance from the central axis L increases toward the front end side of the first stem. By disposing the first stem 411 in this way, the first stem support portion 413 is easily disposed near the movable unit support unit 51.

An inclination degree of an axis L411 of the first stem 411 with respect to the X axis is not particularly limited, is preferably 10° or larger and 45° or smaller, and is more preferably 10° or larger and 30° or smaller. Thus, it is possible to suppress expansion of the first fixed electrode unit 41 in the Y axis direction and it is possible to achieve miniaturization of the element unit 3.

The first fixed electrode fingers 412 extend from the first stem 411 on both sides of the Y axis direction. That is, the first fixed electrode fingers 412 includes a first fixed electrode finger 412a located with respect to the first stem 411 on the positive side of the Y axis direction and a first fixed electrode finger 412b located on the negative side of the Y axis direction. The pluralities of first fixed electrode fingers 412a and 412b are each installed to be separated from each other in the X axis direction.

The length (the length in the Y axis direction) of the plurality of first fixed electrode fingers 412a gradually decreases on the positive side of the X axis direction. Front ends of the pluralities of first fixed electrode fingers 412a are each located on the same straight line in the X axis direction. On the other hand, the length (the length in the Y axis direction) of the plurality of first fixed electrode fingers 412b gradually increases on the positive side of the X axis direction. Front ends of the pluralities of first fixed electrode fingers 412b are each located on the same straight line in the X axis direction. Total lengths of the first fixed electrode fingers 412a and the first fixed electrode fingers 412b which are disposed side by side in the Y axis direction are substantially the same as each other.

The second fixed electrode unit 42 includes a second stem support portion 423 that is fixed to the base unit 2, the second stem 421 that is supported by the second stem support portion 423, and the plurality of second fixed electrode fingers 422 that extend from the second stem 421 on both sides of the Y axis direction. The second stem support portion 423, the second stem 421, and the second fixed electrode fingers 422 are formed to be integrated.

The second stem support portion 423 includes a bond portion 423a bonded to an upper surface of the mount unit 23. The bond portion 423a is disposed to be close to the second stem support portion 423 on the negative side of the X axis direction.

The second stem 421 is formed in a rod-like longitudinal shape and one end of the second stem is connected to the second stem support portion 423. Thus, the second stem is supported by the second stem support portion 423. The second stem 421 extends in a direction inclined with respect to the X and Y axes in the plan view in the Z axis direction. More specifically, the second stem 421 is inclined so that a separate distance from the central axis L increases toward the front end side of the second stem. By disposing the second stem in this way, the second stem support portion 423 is easily disposed near the movable unit support unit 51.

An inclination degree of an axis L421 of the second stem 421 with respect to the X axis is not particularly limited, is preferably 10° or larger and 45° or smaller, and is more preferably 10° or larger and 30° or smaller. Thus, it is possible to suppress expansion of the second fixed electrode unit 42 in the Y axis direction and it is possible to achieve miniaturization of the element unit 3.

The second fixed electrode fingers 422 extend from the second stem 421 on both sides of the Y axis direction. That is, the second fixed electrode fingers 422 includes a second fixed electrode finger 422a located with respect to the second stem 421 on the positive side of the Y axis direction and a second fixed electrode finger 422b located on the negative side of the Y axis direction. The pluralities of second fixed electrode fingers 422a and 422b are each installed to be separated from each other in the X axis direction.

The length (the length in the Y axis direction) of the plurality of second fixed electrode fingers 422a gradually increases on the positive side of the X axis direction. Front ends of the pluralities of second fixed electrode fingers 422a are each located on the same straight line in the X axis direction. On the other hand, the length (the length in the Y axis direction) of the plurality of second fixed electrode fingers 422b gradually decreases on the positive side of the X axis direction. Front ends of the pluralities of second fixed electrode fingers 422b are each located on the same straight line in the X axis direction. Total lengths of the second fixed electrode fingers 422a and the second fixed electrode fingers 422b which are disposed side by side in the Y axis direction are substantially the same as each other.

Next, as illustrated in FIG. 1, the movable electrode unit 6 includes the first movable electrode unit 61 located in the first opening 528 and the second movable electrode unit 62 located in the second opening 529. The first movable electrode unit 61 and the second movable electrode unit 62 are disposed side by side in the Y axis direction.

The first movable electrode unit 61 includes the plurality of first movable electrode fingers 611 that are located on both sides of the first stem 411 in the Y axis direction and extend in the Y axis direction. That is, the first movable electrode finger 611 includes a first movable electrode finger 611a that is located with respect to the first stem 411 on the positive side of the Y axis direction and a first movable electrode finger 611b that is located on the negative side of the Y axis direction. The pluralities of first movable electrode fingers 611a and 611b are each installed to be separated from each other in the X axis direction. The first movable electrode finger 611a extends from the frame 521 toward the negative side of the Y axis direction, and the first movable electrode finger 611b extends from the first X axis extension portion 523 toward the positive side of the Y axis direction.

Each first movable electrode finger 611 is located with respect to the corresponding first fixed electrode finger 412 on the positive side of the X axis direction and is opposite to the first fixed electrode finger 412 with a gap interposed therebetween.

The length (the length in the Y axis direction) of the plurality of first movable electrode fingers 611a gradually decreases on the positive side of the X axis direction. Front ends of the pluralities of first movable electrode fingers 611a are each located on the same straight line in an extension direction of the first stem 411. On the other hand, the length (the length in the Y axis direction) of the plurality of first movable electrode fingers 611b gradually increases on the positive side of the X axis direction. Front ends of the pluralities of first movable electrode fingers 611b are each located on the same straight line in the extension direction of the first stem 411. Total lengths of the first movable electrode fingers 611a and the first movable electrode fingers 611b which are disposed side by side in the Y axis direction are substantially the same as each other.

The second movable electrode unit 62 includes the plurality of second movable electrode fingers 621 that are located on both sides of the second stem 421 in the Y axis direction and extend in the Y axis direction. That is, the second movable electrode finger 621 includes a second movable electrode finger 621a that is located with respect to the second stem 421 on the positive side of the Y axis direction and a second movable electrode finger 621b that is located on the negative side of the Y axis direction. The pluralities of second movable electrode fingers 621a and 621b are each installed to be separated from each other in the X axis direction. The second movable electrode finger 621a extends from the second X axis extension portion 525 toward the negative side of the Y axis direction, and the second movable electrode finger 621b extends from the frame 521 toward the positive side of the Y axis direction.

Each second movable electrode finger 621 is located with respect to the corresponding second fixed electrode finger 422 on the negative side of the X axis direction and is opposite to the second fixed electrode finger 422 with a gap interposed therebetween.

The length (the length in the Y axis direction) of the plurality of second movable electrode fingers 621a gradually increases on the positive side of the X axis direction. Front ends of the pluralities of second movable electrode fingers 621a are each located on the same straight line in an extension direction of the second stem 421. On the other hand, the length (the length in the Y axis direction) of the plurality of second movable electrode fingers 621b gradually decreases on the positive side of the X axis direction. Front ends of the pluralities of second movable electrode fingers 621b are each located on the same straight line in the extension direction of the second stem 421. Total lengths of the second movable electrode fingers 621a and the second movable electrode fingers 621b which are disposed side by side in the Y axis direction are substantially the same as each other.

As described above, an acceleration sensor that is capable of measuring the acceleration Ax in the X axis direction, which is the first direction, is described as the physical quantity sensor 1 according to the invention; however, the physical quantity sensor is not limited thereto and may be an angular velocity sensor that measures angular velocity around the Z axis.

As described above, according to the physical quantity sensor 1 of the first embodiment, the following characteristics are obtained.

The length H1 of the spring unit 53 in the Z axis direction is shorter than the length H2 of the movable unit 52 in the Z axis direction. Therefore, it is possible to more weaken the stiffness of the spring unit 53, compared to a case where the spring unit 53 and the movable unit 52 have the same plate thickness (length in the Z axis direction) as each other. Therefore, since it is possible to increase the amount of displacement of the movable unit 52 in the X axis direction, and it is possible to increase the amount of change in electrostatic capacitance between the fixed electrode fingers 422 and the movable electrode fingers 621, it is possible to obtain high measurement sensitivity. Since the amount of displacement of the movable unit 52 increases, it is possible to widen a gap between the electrodes. Therefore, it is possible to decrease the squeezed film damping (flow resistance of gas between electrodes), and it is possible to reduce noise due to the squeezed film damping.

The length H1 of the spring unit 53 in the Z axis direction is longer than the length W of the spring unit 53 in the X direction. Therefore, it is possible to maintain the spring property in the X axis direction while maintaining the stiffness in the Z axis direction.

The length G1 between the spring unit 53 and the base unit 2 in the Z axis direction is longer than the length G2 between the movable unit 52 and the base unit 2 in the Z axis direction. Therefore, the spring unit 53 and the base unit 2 are separated from each other with the gap (length in the Z axis direction) interposed therebetween, it is possible to decrease the slide film damping occurring between the spring unit 53 and the base unit 2, and it is possible to reduce noise due to the slide film damping.

Hence, it is possible to obtain the physical quantity sensor 1 that has the high measurement sensitivity, small noise due to a damping effect, and a good S/N characteristic.

Method of Manufacturing Physical Quantity Sensor

Next, an examples of a method of manufacturing the physical quantity sensor 1 is described with reference to FIGS. 6 to 7E.

Figure 6:
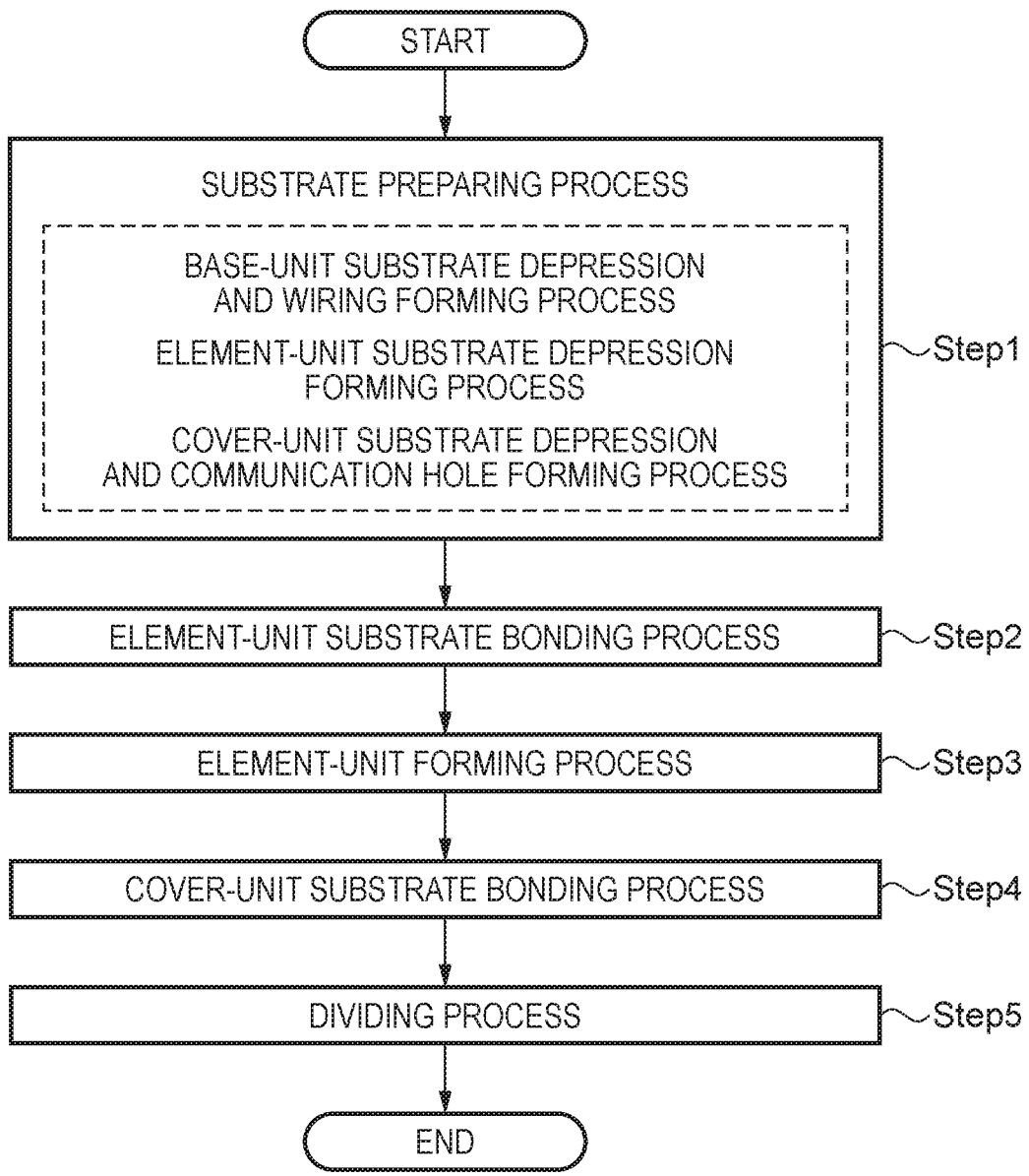
FIG. 6 is a flowchart illustrating a manufacturing process of the physical quantity sensor according to the first embodiment of the invention.

FIG. 6 is a flowchart illustrating main manufacturing processes of the physical quantity sensor. FIGS. 7A to 7E are sectional views illustrating each of the manufacturing processes of the physical quantity sensor. FIGS. 7A to 7E correspond to FIG. 3 that is the sectional view taken along line B-B of FIG. 1.

As illustrated in FIG. 6, the method of manufacturing the physical quantity sensor 1 includes a substrate forming process Step 1, an element-unit substrate bonding process Step 2, an element unit forming process Step 3, a lid substrate bonding process Step 4, and a dividing process Step 5.

Here, manufacturing a plurality of physical quantity sensors is assumed in the description; however, the physical quantity sensors may be individually manufactured.

Substrate Preparing Process Step 1

Figure 7A:
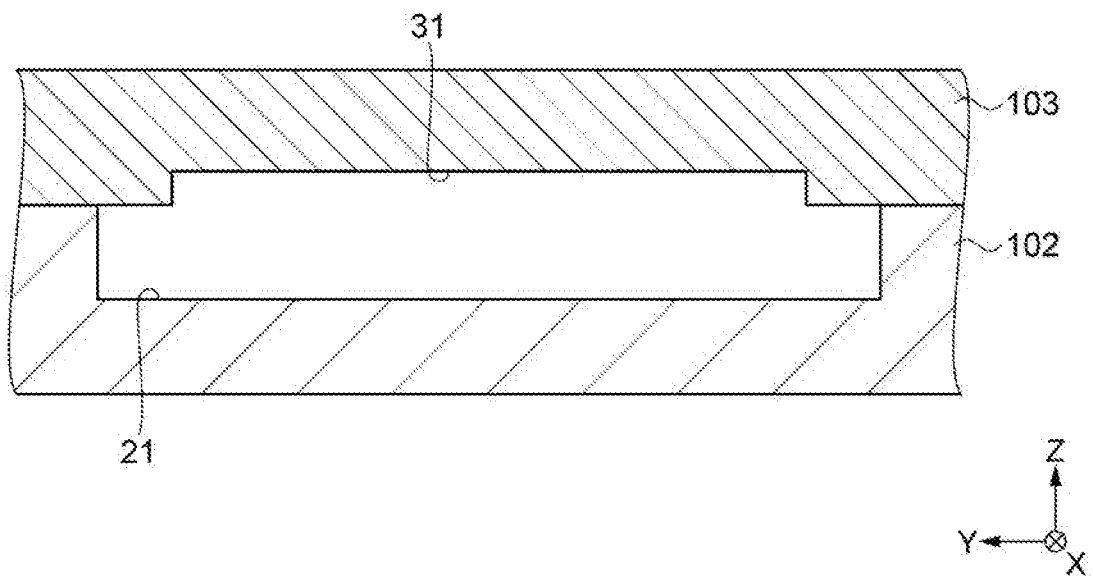
FIG. 7A is a sectional view illustrating the manufacturing process of the physical quantity sensor according to the first embodiment of the invention.
Figure 7B:
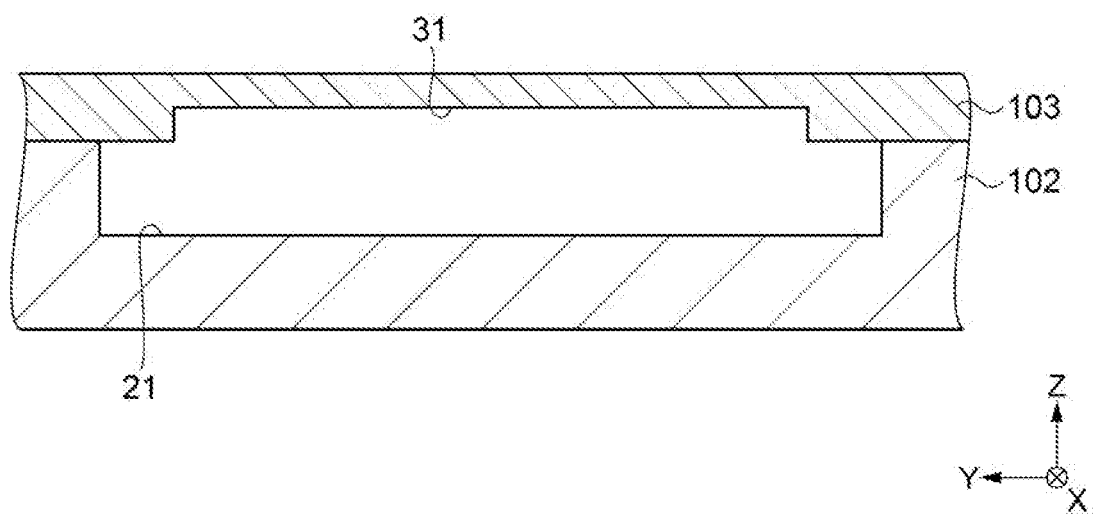
FIG. 7B is a sectional view illustrating the manufacturing process of the physical quantity sensor according to the first embodiment of the invention.
Figure 7C:
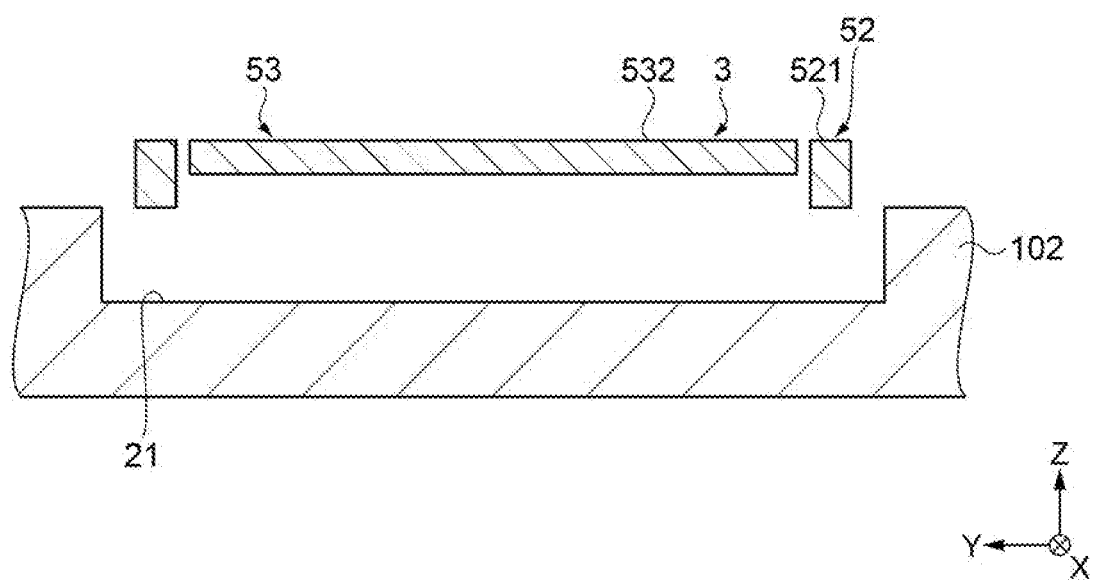
FIG. 7C is a sectional view illustrating the manufacturing process of the physical quantity sensor according to the first embodiment of the invention.
Figure 7D:
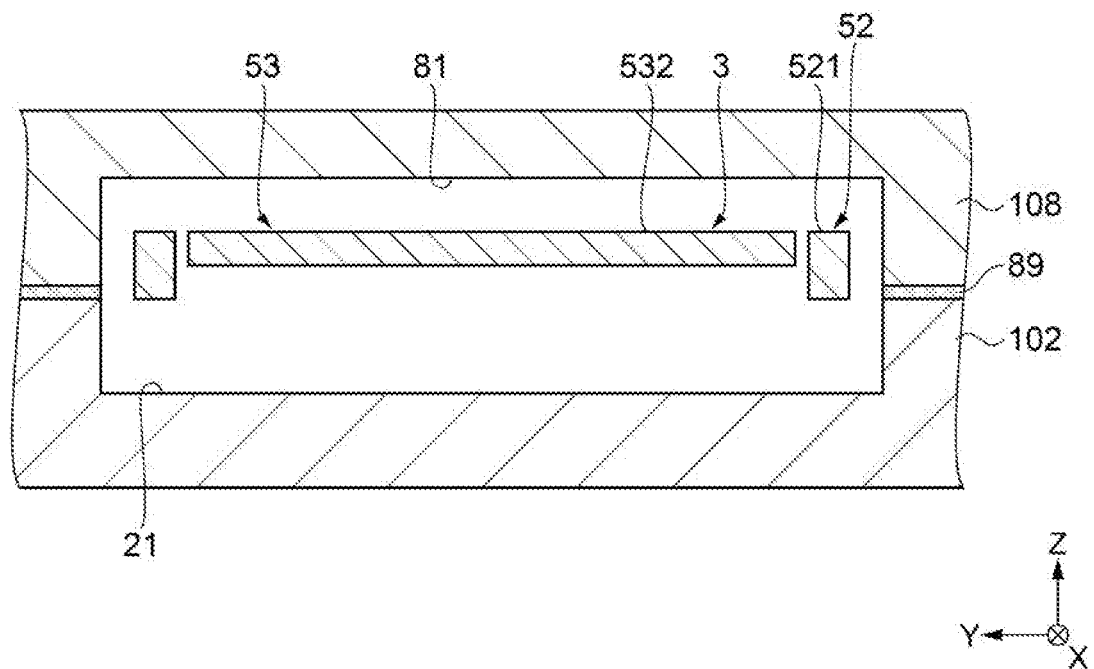
FIG. 7D is a sectional view illustrating the manufacturing process of the physical quantity sensor according to the first embodiment of the invention.

First, as illustrated in FIG. 7A, separation will be performed thereafter, and thereby a base-unit substrate 102 having a wafer shape, which becomes the base unit 2 as a support substrate, an element-unit substrate 103 having a wafer shape which becomes the element unit 3, and a lid substrate 108 having a wafer shape which becomes the lid 8, as illustrated in FIG. 7D, are prepared. Here, a base-unit substrate recess and wiring forming process, an element-unit substrate recess forming process, and a lid substrate recess and communication hole forming process are performed on the substrate in advance. The three processes are described below.

Base-Unit Substrate Recess and wiring Forming Process

An upper surface of the base-unit substrate 102 is subjected to etching, and thereby the recess 21 is formed. Here, although not illustrated in FIG. 7A, the grooves 25, 26, and 27 are also collectively formed. A method (etching method) of forming the recess 21 and the grooves 25 to 27 is not particularly limited. For example, it is possible to use a combination of one or two or more of a physical etching method such as plasma etching, reactive ion etching, beam etching, or photo-assisted etching, a chemical etching such as wet etching, or the like. It is also possible to use the same method for the etching performed in each of the following processes.

During the above-described etching, for example, it is possible to suitably use a mask formed by a photolithography method. Mask forming, it is possible to repeat etching, and mask removing a plurality of times and form the recess 21 and the grooves 25 to 27 in an order. The mask is removed after the etching. For example, it is possible to use a resist peeling solution in a case where the mask is made of a resist material and to use a metal peeling solution such as a phosphoric acid solution in a case where the mask is made of a metal material, as a method of removing the mask.

For example, a gray-scale mask is used as the mask, and thereby the recess 21 and the grooves 25 to 27 (plurality of recess having different depths from each other) may be collectively formed.

Next, although not illustrated in FIG. 7A, the wirings 71, 72, and 73 are collectively formed in the grooves 25, 26, and 27 of the base-unit substrate 102, respectively.

In this case, the wirings 71, 72, and 73 are formed to have thickness dimensions (lengths in the Z axis direction) smaller than depth dimensions (lengths in the Z axis direction) of the grooves 25, 26, and 27.

A method (film forming method) of forming the wirings 71, 72, and 73 is not particularly limited, and examples of the method include a dry method such as vacuum vapor deposition, sputtering (low-temperature sputtering), or ion plating, a plating method, a wet plating method of electroplating or electroless plating, a spraying method, a thin film bonding method, and the like. It is also possible to use the same method for the forming of the films in the following processes.

An amorphous material having an insulation property is preferably used for the base-unit substrate 102, and a transparent substrate is more preferably used as the substrate made of the amorphous material. Specifically, a glass substrate made of a glass material (for example, borosilicate glass), which contains alkali metal ions (movable ions), is preferably used for the base-unit substrate 102.

A transparent electrode material (particularly, ITO) is preferably used as a constituent material of the wirings 71 to 73.

Element-Unit Substrate Recess Forming Process

Next, as illustrated in FIG. 7A, for example, a surface of the element-unit substrate 103 having a wafer shape, which becomes the element unit 3 later, is cleaned by a reverse sputtering method in advance, and a foreign substance such as an oxide film is removed.

Subsequently, a region of one main surface of the element-unit substrate 103, in which the spring units 53 and 54 are formed, is subjected to etching, and thereby a recess 31 is formed. The method of forming the recess 31 may be the same as the method of forming the recess 21 or the grooves 25 to 27 in the base-unit substrate 102.

The element-unit substrate 103 is preferably thicker than the element unit 3 in thickness. Thus, it is possible to improve a handling property of the element-unit substrate 103 (for example, a decrease in damage during transport, during arrangement, or the like).

The thickness of the element-unit substrate 103 may be equal to the thickness of the element unit 3, or a silicon substrate, which is a semiconductor substrate, is preferably used for the element-unit substrate 103.

Lid Substrate Recess and Communication Hole Forming Process

Next, as illustrated in FIG. 7D, for example, a surface of the lid substrate 108 having the wafer shape, which becomes the lid 8 for protecting the element unit 3, is cleaned by the reverse sputtering method or the like in advance, and a foreign substance such as an oxide film is removed.

Subsequently, the lower surface of the lid substrate 108 is subjected to etching, and thereby the recess 81 is formed.

Then, although not illustrated in FIG. 7D, the communication hole 82 is formed by etching a region in which the recess 81 is formed.

The method of forming the recess 81 and the communication hole 82 may be the same as the method of forming the recess 21 or the grooves 25 to 27 in the base-unit substrate 102.

A silicon substrate, which is a semiconductor substrate, is preferably used as a constituent material of the lid substrate 108.

Here, the base-unit substrate recess and wiring forming process, the element-unit substrate recess forming process, and the lid substrate recess and communication hole forming process can simultaneously proceed in the substrate preparing process Step 1 by using separate lines from each other.

Element-Unit Substrate Bonding Process Step 2

Next, as illustrated in FIG. 7A, the element-unit substrate 103 is disposed on the upper surface of the base-unit substrate 102 on which the recess 21 of the base-unit substrate 102 is installed, and the base-unit substrate 102 is bonded to the element-unit substrate 103. An anodic bonding method is preferably used for the bonding between the base-unit substrate 102 and the element-unit substrate 103.

Next, as illustrated in FIG. 7B, the element-unit substrate 103 has a thickness decreased to be equal to the thickness of the element unit 3 (length in the Z axis direction). A method of decreasing the thickness is not particularly limited, and it is possible to suitably use a CMP method, or a dry polish method, for example.

When the thickness of the element-unit substrate 103 (the length in the Z axis direction) is equal to the thickness of the element unit 3 (the length in the Z axis direction) from the beginning, there is no need to decrease the thickness.

Element unit Forming Process Step 3

Next, as illustrated in FIG. 7C, the element-unit substrate 103 is subjected to the etching, and thereby the element unit 3 is formed.

Lid Substrate Bonding Process Step 4

Next, as illustrated in FIG. 7D, the base-unit substrate 102 has a plurality of recess 81 and is separated, and the lid substrate 108 having the wafer shape, which becomes the lid 8, is bonded to the upper surface of the base-unit substrate 102 via the glass frit 89 (low-melting point glass), which is an example of a bonding material. Thus, the base-unit substrate 102 and the lid substrate 108 accommodate each element unit 3 in each recess 81.

A method of bonding the base-unit substrate 102 and the lid substrate 108 is not particularly limited and examples of the method may include an anodic bonding method, a direct bonding method, or the like.

Dividing Process Step 5

Figure 7E:
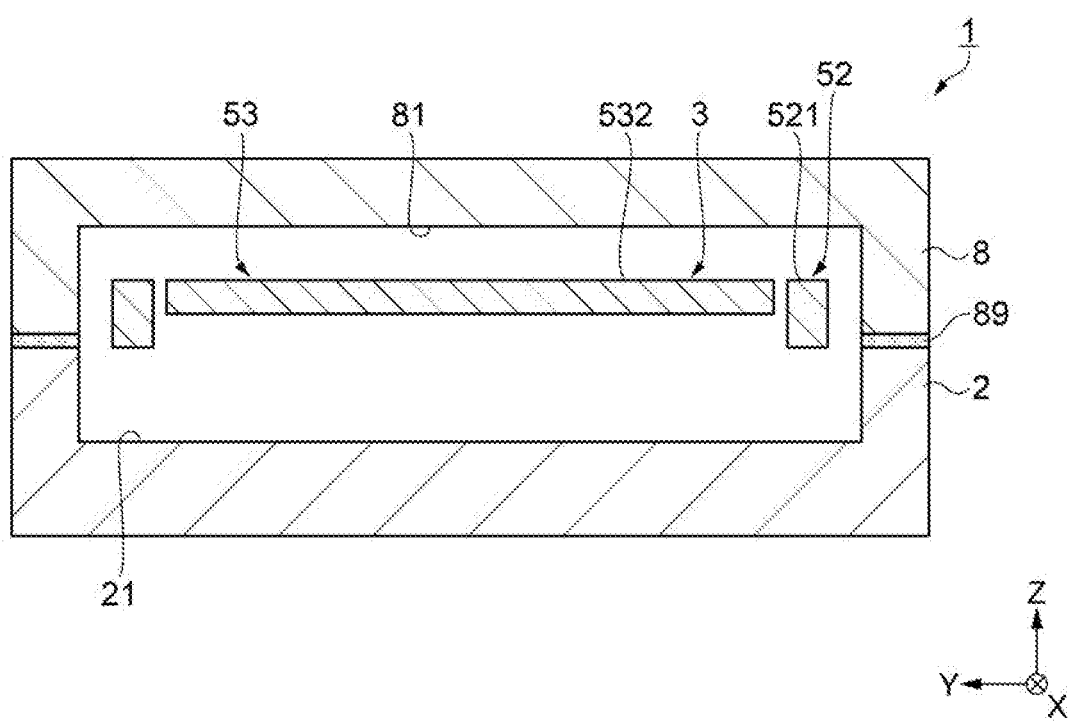
FIG. 7E is a sectional view illustrating the manufacturing process of the physical quantity sensor according to the first embodiment of the invention.

Next, as illustrated in FIG. 7E, the base-unit substrate 102 and the lid substrate 108 which are integrated with the element unit 3 accommodated therein are divided into each of individual pieces for each of the element unit by using a division device (for example, a dicing apparatus) (not illustrated) or the like, and thereby the physical quantity sensor 1 is obtained.

Through the division, the base-unit substrate 102 becomes the base unit 2 and the lid substrate 108 becomes the lid 8.

Second Embodiment

Figure 8:
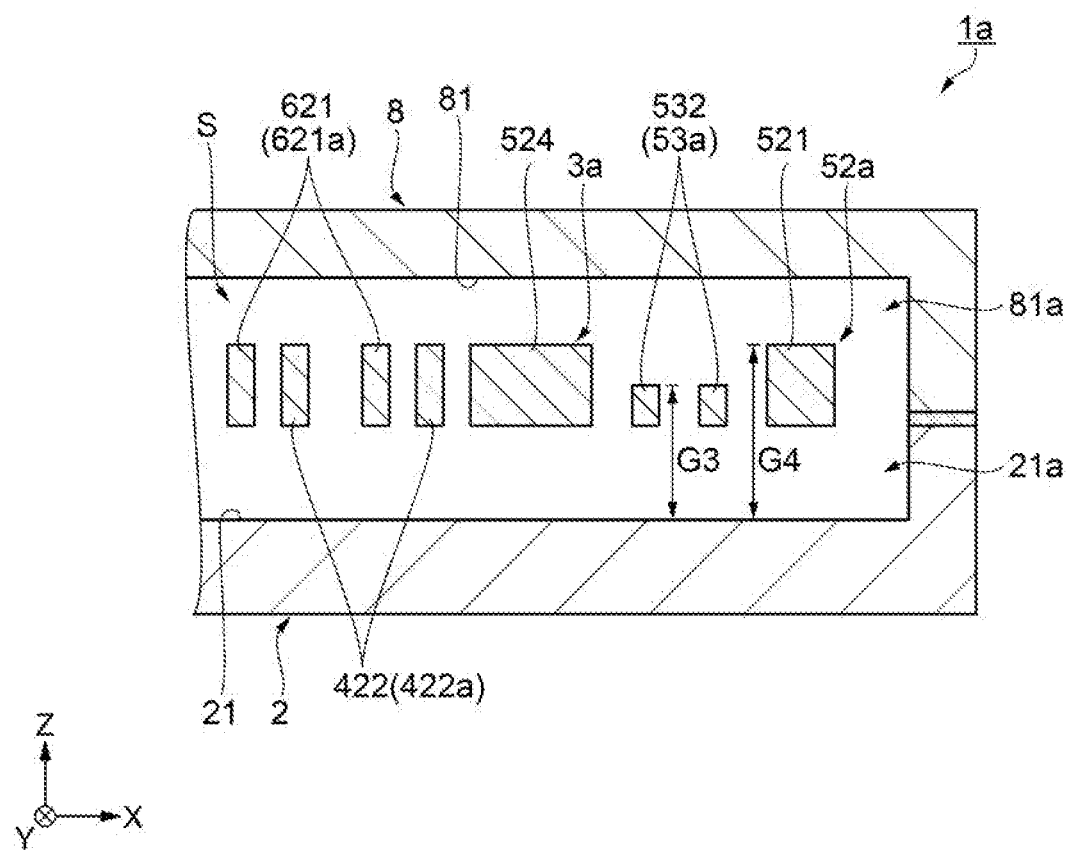
FIG. 8 is a sectional view illustrating a part of a spring unit and a movable unit included in a physical quantity sensor according to a second embodiment of the invention.

Next, a physical quantity sensor 1a according to a second embodiment of the invention will be described with reference to FIG. 8. FIG. 8 is a sectional view illustrating a part of the spring unit and the movable unit included in a physical quantity sensor according to the second embodiment of the invention. FIG. 8 corresponds to FIG. 4 illustrating a sectional portion taken along line C-C.

The physical quantity sensor 1a according to the embodiment is the same as the physical quantity sensor 1 according to the above-described first embodiment except that the configuration of a spring unit 53a has a different configuration.

In the following description, in the physical quantity sensor 1a according to the second embodiment, differences from the above-described embodiment will be described mainly and the same factors will not be described. In FIG. 8, the same reference signs are assigned to the same configurations as those of the above-described embodiment.

As illustrated in FIG. 8, the spring unit 53a of the physical quantity sensor 1a according to the second embodiment has a plate thickness (the length in the Z axis direction) which is smaller than a plate thickness of a movable unit 52a, and a length G3 between a surface of the spring unit 53a on a side opposite to the base unit 2 and the base unit 2 (the bottom surface of the recess 21) in the Z axis direction is smaller than a length G4 between a surface of the movable unit 52a on a side opposite to the base unit 2 and the base unit 2 in the Z axis direction. Hence, the plate thickness of the spring unit 53a is smaller than the plate thickness of the movable unit 52a, and thus it is possible to achieve the same effects as those of the first embodiment. The length G3 between the surface of the spring unit 53a on the side opposite to the base unit 2 and the base unit 2 in the Z axis direction is smaller than the length G4 between a surface of the movable unit 52a on a side opposite to the base unit 2 and the base unit 2 in the Z axis direction. Therefore, when the element unit 3a is formed, it is possible to form the element unit from the surface on a side opposite to a surface on a side of the base unit 2 by the photolithography technology, and performing an etching process, and it is possible to omit the element-unit substrate recess forming unit in the substrate preparing unit (Step 1) illustrated in FIG. 6. Therefore, it is easy to perform the manufacturing.

Third Embodiment

Figure 9:
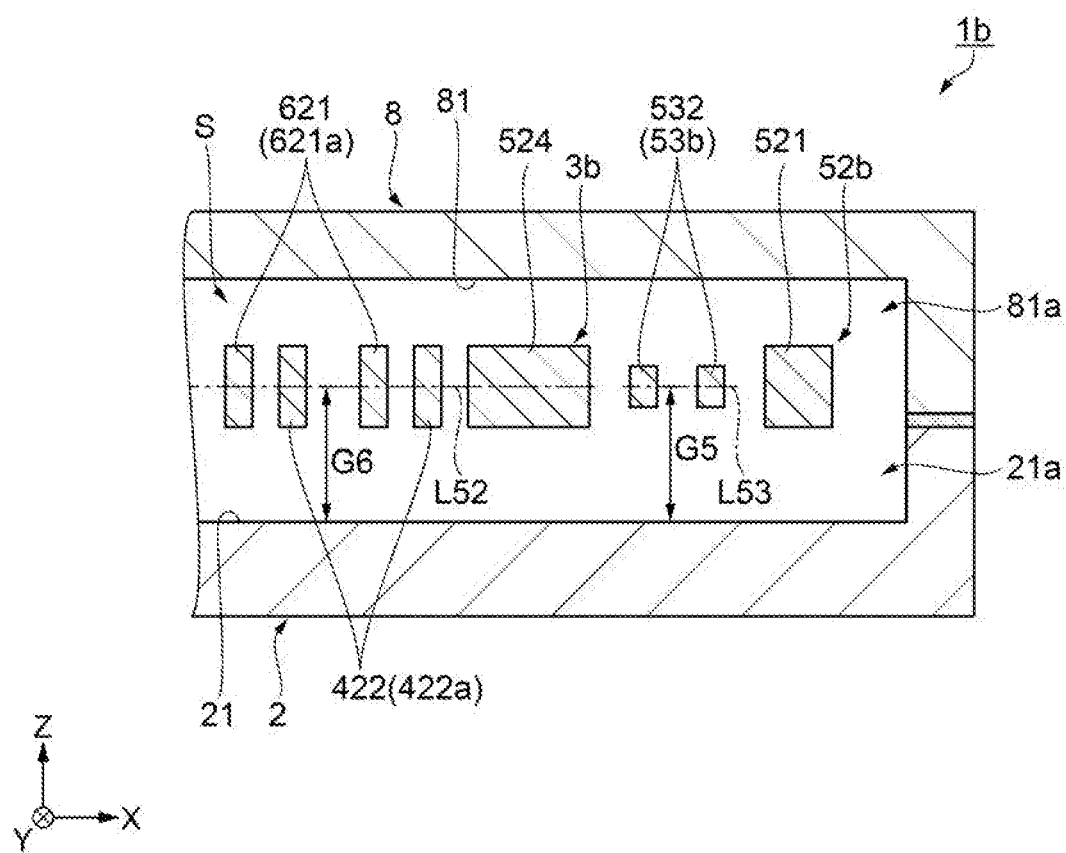
FIG. 9 is a sectional view illustrating a part of a spring unit and a movable unit included in a physical quantity sensor according to a third embodiment of the invention.

Next, a physical quantity sensor 1b according to a third embodiment of the invention will be described with reference to FIG. 9. FIG. 9 is a sectional view illustrating a part of the spring unit and the movable unit included in a physical quantity sensor according to the third embodiment of the invention. FIG. 9 corresponds to FIG. 4 illustrating a sectional portion taken along line C-C.

A physical quantity sensor 1b according to the embodiment is mainly the same as the physical quantity sensor 1 according to the above-described first embodiment except that a spring unit 53b has a different configuration.

In the following description, in the physical quantity sensor 1b according to the third embodiment, differences from the above-described embodiment will be described mainly and the same factors will not be described. In FIG. 9, the same reference numerals are given to the same configurations as those of the above-described embodiment.

As illustrated in FIG. 9, the spring unit 53b of the physical quantity sensor 1b according to the third embodiment has a plate thickness (the length in the Z axis direction) which is smaller than the plate thickness of a movable unit 52b, and a length G5 between the gravity center (gravity center axis L53) of the spring unit 53b and the base unit 2 (the bottom surface of the recess 21) in the Z axis direction is equal to a length G6 between the gravity center (gravity center axis L52) of the movable unit 52b including the movable electrode fingers 621 and the base unit 2 in the Z axis direction. Hence, the plate thickness of the spring unit 53b is smaller than the plate thickness of the movable unit 52b, and thus it is possible to achieve the same effects as those of the first embodiment. The length G5 between the gravity center of the spring unit 53b and the base unit 2 in the Z axis direction is equal to the length G6 between the gravity center of the movable unit 52b and the base unit 2 in the Z axis direction. Therefore, when the spring unit 53b is bent, it is possible to displace the movable unit 52b in the X axis direction in a state in which the surfaces of the spring unit 53b and the movable unit 52b, which are opposite to each other, are parallel to each other.

Fourth Embodiment

Figure 10:
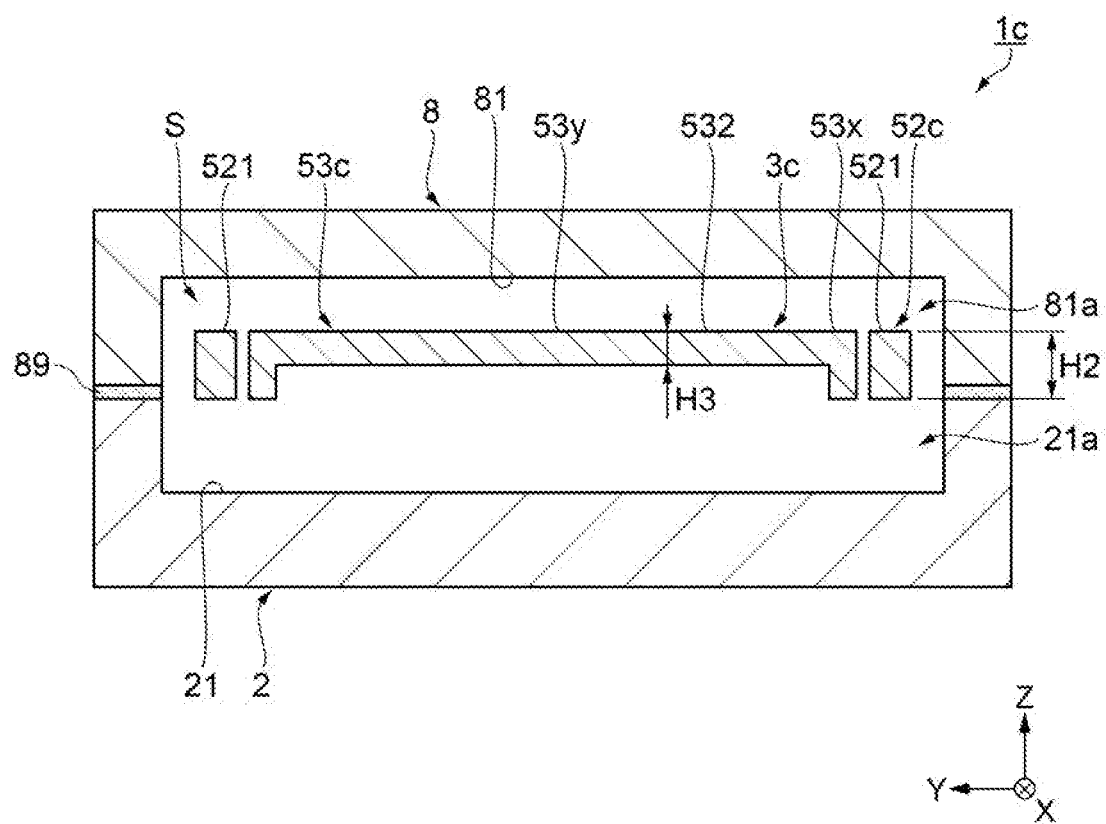
FIG. 10 is a sectional view illustrating a part of a spring unit and a movable unit included in a physical quantity sensor according to a fourth embodiment of the invention.

Next, a physical quantity sensor 1c according to a fourth embodiment of the invention will be described with reference to FIG. 10. FIG. 10 is a sectional view illustrating a part of the spring unit and the movable unit included in the physical quantity sensor according to the fourth embodiment of the invention. FIG. 10 corresponds to FIG. 3 illustrating a sectional portion taken along line B-B.

The physical quantity sensor 1c according to the embodiment is mainly the same as the physical quantity sensor 1 according to the above-described first embodiment except that a spring unit 53c has a different configuration.

In the following description, in the physical quantity sensor 1c according to the fourth embodiment, differences from the above-described embodiments will be described mainly and the same factors will not be described. In FIG. 10, the same reference signs are assigned to the same configurations as those of the above-described embodiment.

As illustrated in FIG. 10, the spring unit 53c of the physical quantity sensor 1c according to the fourth embodiment has a plate thickness (a length in the Z axis direction) which is smaller than a plate thickness of a movable unit 52c in a part of the spring unit 53c. In other words, a length H3 of the portion 53y of the spring unit 53c in the Z axis direction, which extends long in the Y axis direction, is shorter than the length H2 of the movable unit 52c in the Z axis direction, and a plate thickness of the portion 53x of the spring unit 53c, which extends short in the X axis direction, is equal to the length H2 of the movable unit 52c in the Z axis direction. Hence, a part of the plate thickness of the spring unit 53c is smaller than the plate thickness of the movable unit 52c, and thus it is possible to achieve the same effects as those of the first embodiment.

Electronic Apparatus

Figure 11:
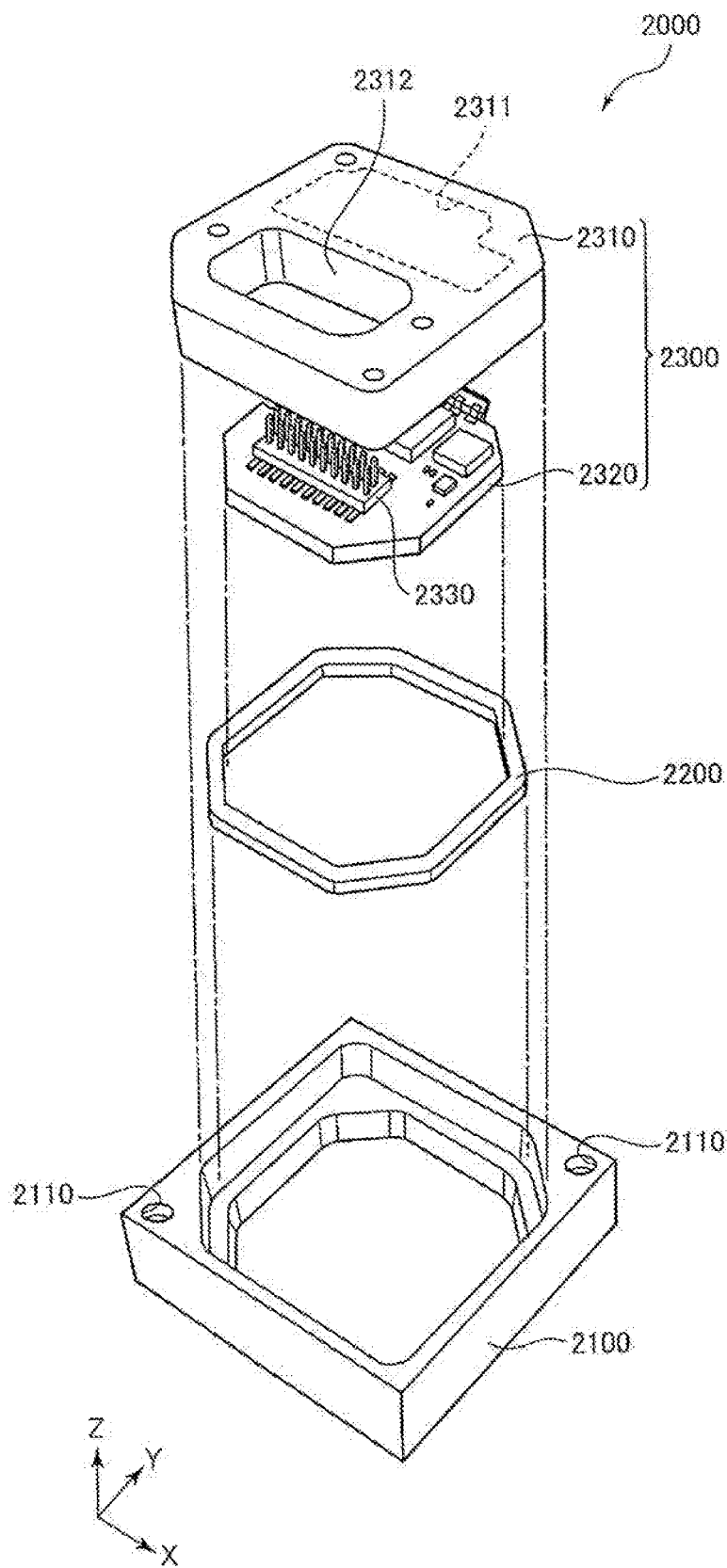
FIG. 11 is an exploded perspective view illustrating a schematic configuration of an inertial measurement unit which is an example of an electronic apparatus.
Figure 12:
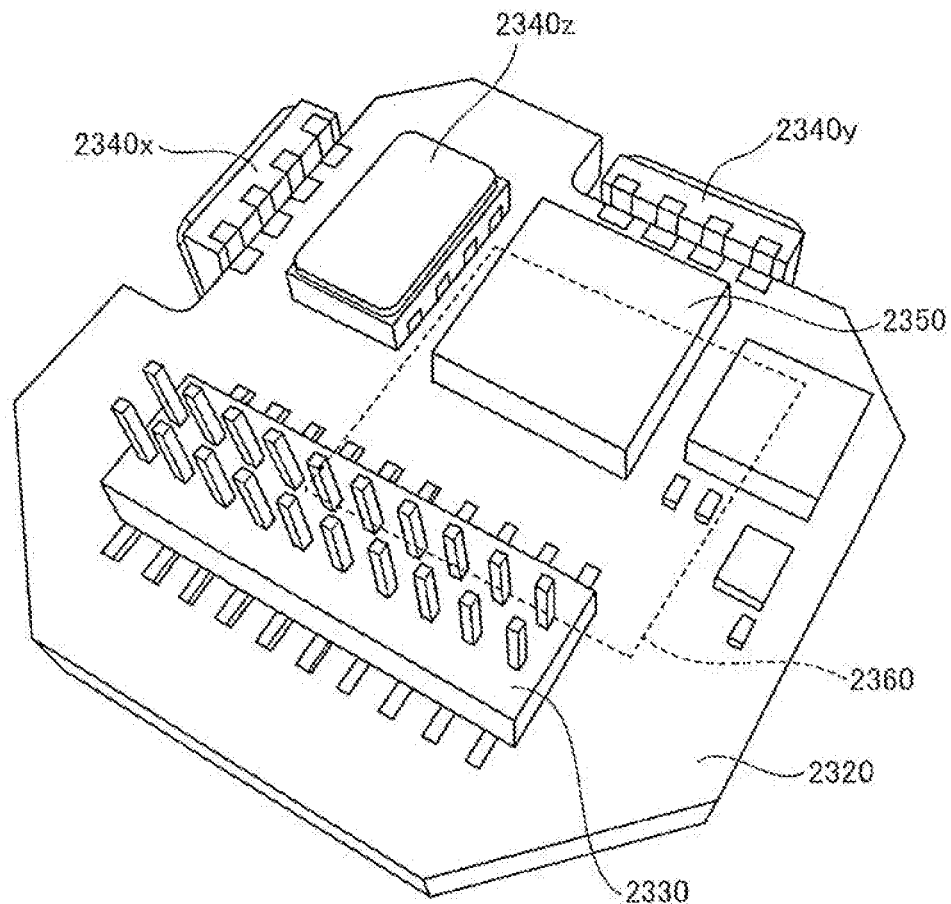
FIG. 12 is a perspective view illustrating a disposing example of inertial sensor elements of the inertial measurement unit.

Next, an inertial measurement unit (IMU) 2000 that is an example of an electronic apparatus, to which the physical quantity sensor 1 according to the first embodiment of the invention is applied, will be described with reference to FIGS. 11 and 12. FIG. 11 is an exploded perspective view illustrating a schematic configuration of the inertial measurement unit. FIG. 12 is a perspective view illustrating a disposing example of inertial sensor elements of the inertial measurement unit.

The inertial measurement unit (IMU) 2000 illustrated in FIG. 11 detects an attitude or behavior (inertial momentum) of a moving body (installation target apparatus) such as an automobile or robot. The inertial measurement unit 2000 includes a three-axis acceleration sensor and a three-axis angular velocity sensor and functions as a so-called six-axis motion sensor.

The inertial measurement unit 2000 has a planar shape of a substantially square rectangular parallelepiped. A screw hole 2110 as a fixing portion is formed in the vicinity of two vertexes which are located in a diagonal direction of a square. It is possible to fix the inertial measurement unit 2000 on an installation target surface of the installation target object such as the automobile through two screws into the two screw holes 2110. For example, component parts are selected or design is changed, and thereby it is possible to decrease a size of the component part that is mountable on a smartphone or a digital camera.

The inertial measurement unit 2000 includes an outer case 2100, a bonding member 2200, and a sensor module 2300 and has a configuration in which the sensor module 2300 is inserted inside the outer case 2100 with the bonding member 2200 sandwiched therebetween. The sensor module 2300 includes an inner case 2310 and a substrate 2320.

Similar to the entire shape of the inertial measurement unit 2000, the outer case 2100 has a planar shape of a substantially square rectangular parallelepiped in the external shape of the outer case, and the screw holes 2110 are formed in the vicinity of the two vertexes which are located in the diagonal direction of the square. The outer case 2100 has a box shape and the sensor module 2300 is housed inside the outer case.

The inner case 2310 supports the substrate 2320 and is formed to enter the inside of the outer case 2100. A recess 2311 for preventing contact with the substrate 2320 or an opening 2312 for exposing a connector 2330 to be described below is formed in the inner case 2310. The inner case 2310 is bonded to the outer case 2100 via the bonding member 2200 (for example, packing having an adhesive impregnated). The substrate 2320 is bonded to the lower surface of the inner case 2310 via the adhesive.

As illustrated in FIG. 12, the connector 2330, an angular velocity sensor 2340z that measures angular velocity around the Z axis, and an acceleration sensor 2350 that measures acceleration in each of the axis directions of the X axis, the Y axis, and the Z axis are provided on an upper surface of the substrate 2320. An angular velocity sensor 2340x that measures angular velocity around the X axis, and an angular velocity sensor 2340y that measures angular velocity around the Y axis are provided on a side surface of the substrate 2320. The angular velocity sensors 2340z, 2340x, and 2340y are not particularly limited and can use a vibration gyro sensor using Coriolis's power, such as the above-described physical quantity sensor 1. The acceleration sensor 2350 is not particularly limited and an electrostatic capacitance type acceleration sensor can be used as the acceleration sensor.

A control IC 2360 is provided as a control circuit on the lower surface of the substrate 2320. The control IC 2360 is a micro controller unit (MCU), is provided with a storage unit including a non-volatile memory, an A/D converter inside the control IC, and controls every unit of the inertial measurement unit 2000. The storage unit stores a program for defining an order and content for measuring the acceleration and the angular velocity, a program for converting measurement data into digital data and incorporating the data into packet data, accompanying data, and the like. In addition, a plurality of electronic components are provided in the substrate 2320.

As described above, the inertial measurement unit 2000 is described. The inertial measurement unit 2000 includes the angular velocity sensors 2340z, 2340x, and 2340y, the acceleration sensor 2350, and the control IC 2360 (control circuit) that controls drive of the sensors 2340z, 2340x, 2340y, and 2350, which are the physical quantity sensor 1. Thus, it is possible to obtain the effects of the above-described physical quantity sensor 1, and thus it is possible to obtain the inertial measurement unit 2000 having high reliability.

Figure 13:
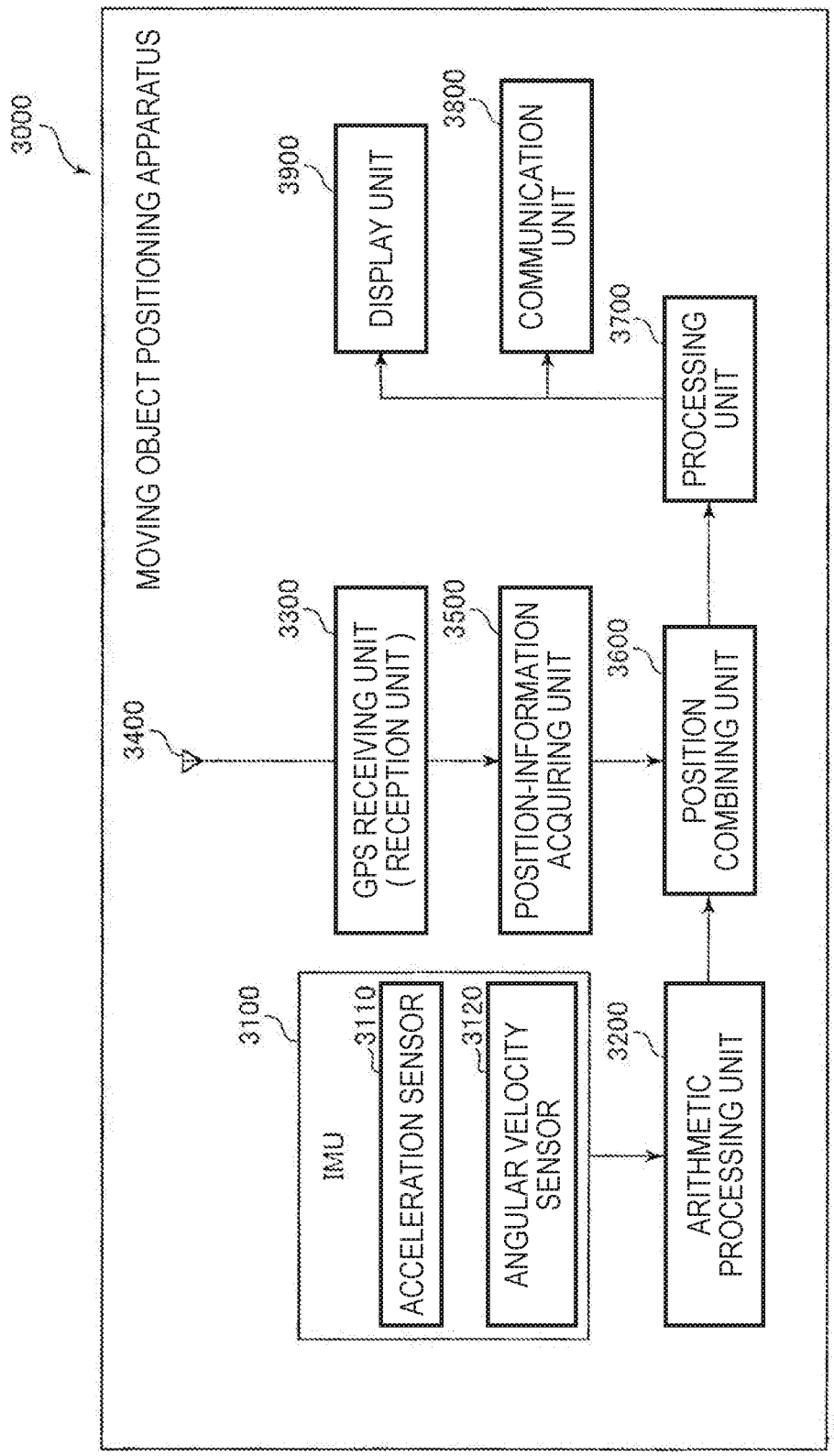
FIG. 13 is a block diagram illustrating an entire system of a vehicle positioning apparatus which is an example of the electronic apparatus.
Figure 14:
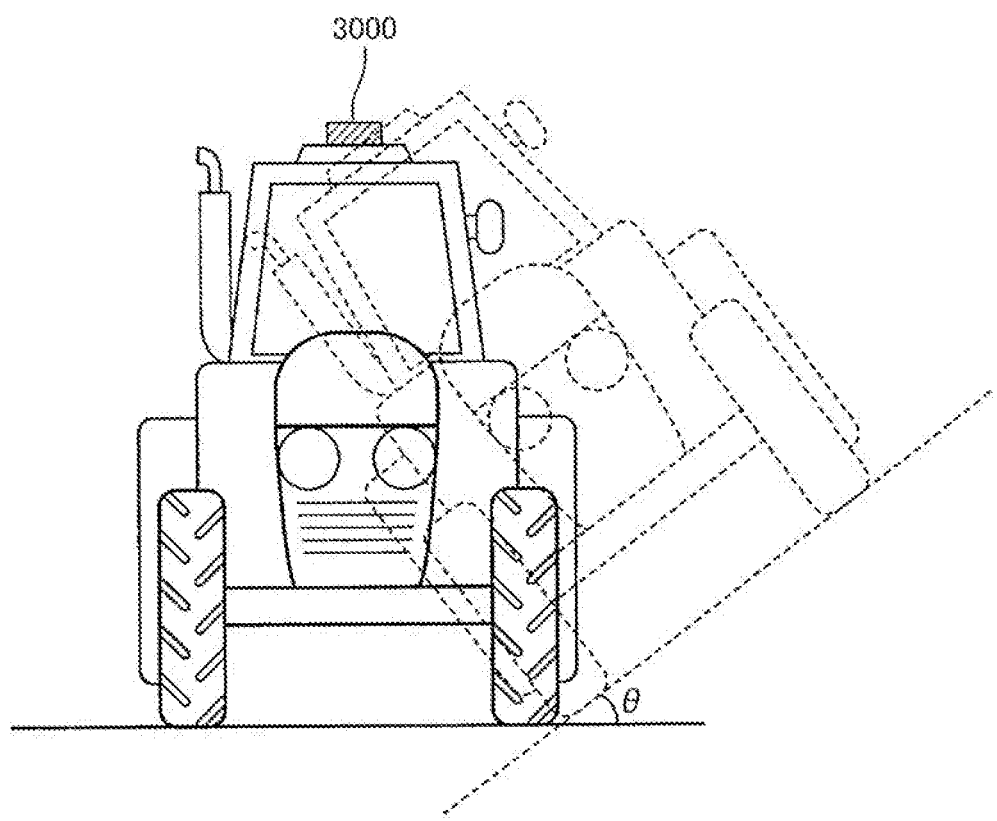
FIG. 14 is a view schematically illustrating an operation of the vehicle positioning apparatus.

Next, a vehicle positioning apparatus 3000 that is an example of an electronic apparatus, to which the physical quantity sensor 1 according to one embodiment of the invention is applied, will be described with reference to FIGS. 13 and 14. FIG. 13 is a block diagram illustrating an entire system of the vehicle positioning apparatus. FIG. 14 is a view schematically illustrating an operation of the vehicle positioning apparatus.

The vehicle positioning apparatus 3000 illustrated in FIG. 13 is used by being provided on a vehicle and performs positioning of the vehicle. The vehicle is not particularly limited and may be a bicycle, an automobile (a four-wheeled vehicle or a motorbike), a train, an airplane, a ship, or the like. Here, in the embodiment, the vehicle is described as the four-wheel automobile. The vehicle positioning apparatus 3000 includes an inertial measurement unit 3100 (IMU), an arithmetic processing unit 3200, a GPS receiving unit 3300, a reception antenna 3400, a position-information acquiring unit 3500, a position combining unit 3600, a processing unit 3700, a communication unit 3800, and a display unit 3900. The above-mentioned inertial measurement unit 2000 can be used as the inertial measurement unit 3100, for example.

The inertial measurement unit 3100 includes the three-axis acceleration sensor 3110 and a three-axis angular velocity sensor 3120. The arithmetic processing unit 3200 as the arithmetic unit receives acceleration data from the acceleration sensor 3110 and angular velocity data from the angular velocity sensor 3120, performs an inertial navigation calculation processing on the data, and outputs inertial navigation positioning data (data containing the acceleration and the attitude of the vehicle).

The GPS receiving unit 3300 as the receiving unit receives a signal (satellite signal obtained by superimposing a GPS carrier wave and positional information) from a GPS satellite via the reception antenna 3400. The position-information acquiring unit 3500 as an acquiring unit outputs GPS positioning data indicating a position (latitude, longitude, and altitude), a speed, and an orientation of the vehicle positioning apparatus 3000 (vehicle) based on the signal received by the GPS receiving unit 3300. The GPS positioning data also includes status data indicating a reception state, a reception time, or the like.

The position combining unit 3600 as a calculating unit calculates a position of the vehicle, specifically, positions on the ground, at which the vehicle travels, based on the inertial navigation positioning data as inertial data output from the arithmetic processing unit 3200 and the GPS positioning data output from the position-information acquiring unit 3500. For example, even when the position of the vehicle, which is included in the GPS positioning data, is the same, the attitude of the vehicle is different due to an influence of inclination of the ground or the like, as illustrated in FIG. 14, the vehicle travels at different positions on the ground. Therefore, it is not possible to calculate accurate position of the vehicle only from the GPS positioning data. The position combining unit 3600 calculates the positions on the ground at which the vehicle travels by using the inertial navigation positioning data (particularly, data related to the attitude of the vehicle). Such corresponding determination can be relatively simply performed through computation using a trigonometric function (an inclination degree θ with respect to a vertical direction).

The position data output from the position combining unit 3600 is subjected to predetermined processing by the processing unit 3700 and is to be displayed on the display unit 3900 as a positioning result. The position data may be transmitted to an external device by the communication unit 3800.

As described above, the vehicle positioning apparatus 3000 is described. The vehicle positioning apparatus 3000, as mentioned above, includes the inertial measurement unit 3100, the GPS receiving unit 3300 (reception unit) that receives the satellite signal obtained by superimposing the positional information from the positioning satellite, the position-information acquiring unit 3500 (acquiring unit) that acquires the positional information of the GPS receiving unit 3300, the arithmetic processing unit 3200 (arithmetic unit) that computes the attitude of the vehicle based on inertial navigation positioning data (inertial data) output from the inertial measurement unit 3100, and a position combining unit 3600 (calculating unit) that corrects the positional information based on the calculated attitude and calculates the position of the vehicle. Thus, it is possible to obtain the effects of the above-described physical quantity sensor 1 (inertial measurement unit 2000), and thus it is possible to obtain the vehicle positioning apparatus 3000 with high reliability.

Figure 15:
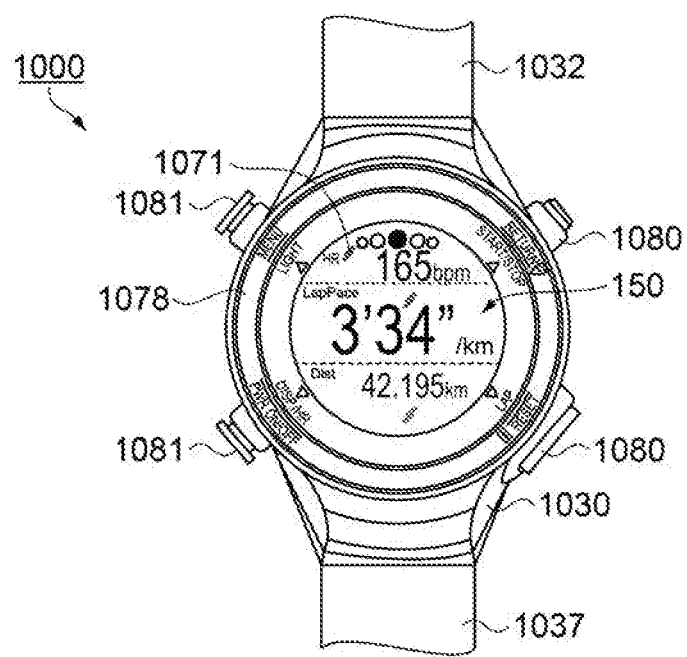
FIG. 15 is a plan view schematically illustrating a configuration of a portable electronic apparatus which is an example of the electronic apparatus.
Figure 16:
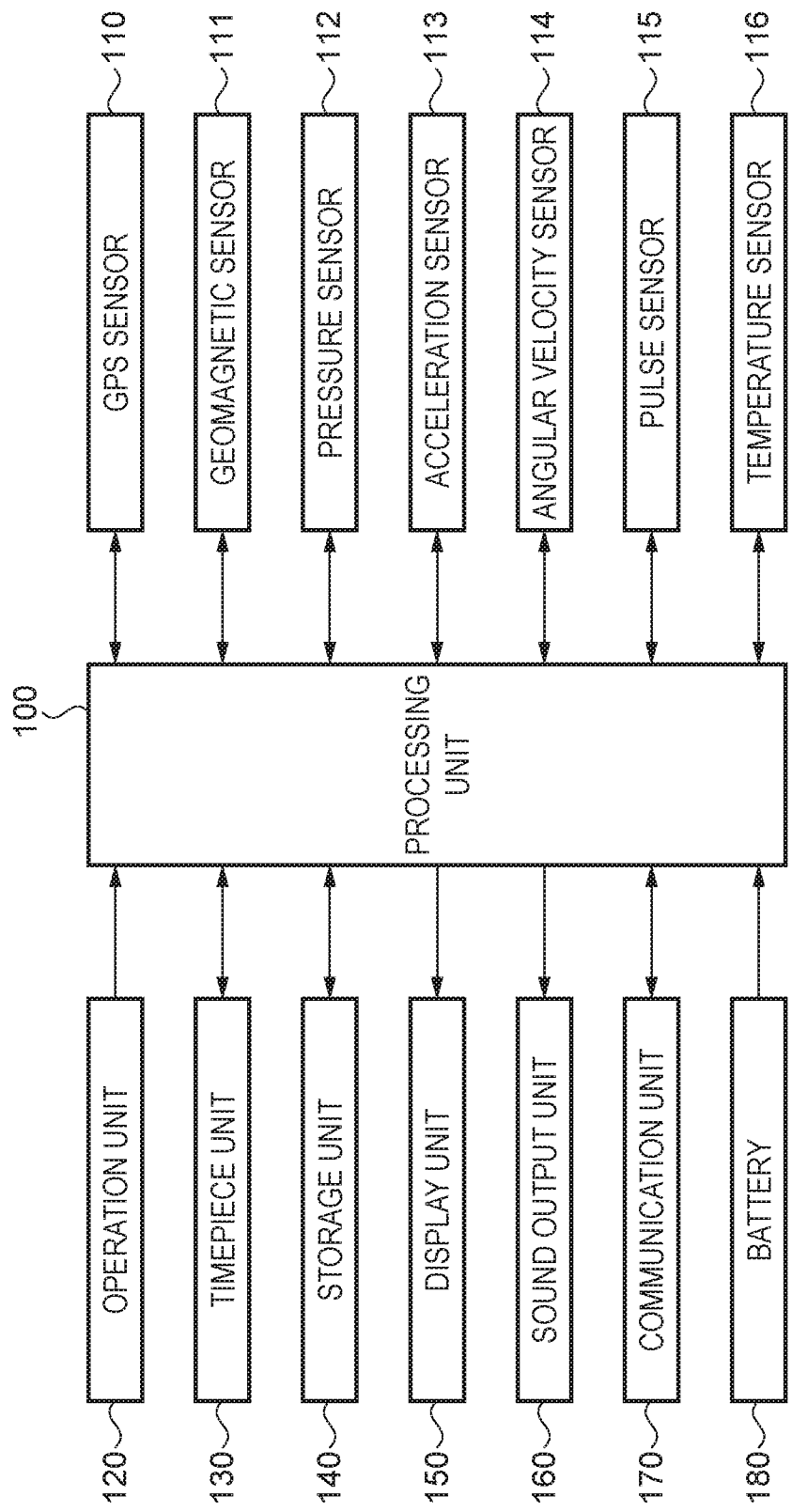
FIG. 16 is a functional block diagram illustrating a schematic configuration of the portable electronic apparatus.

Next, a portable electronic apparatus that is an example of an electronic apparatus, to which the physical quantity sensor 1 according to one embodiment of the invention is applied, will be described with reference to FIGS. 15 and 16. FIG. 15 is a plan view schematically illustrating a configuration of the portable electronic apparatus. FIG. 16 is a functional block diagram illustrating a schematic configuration of the portable electronic apparatus.

Hereinafter, a wristwatch-type activity meter (active tracker) will be described as an example of the portable electronic apparatus.

As illustrated in FIG. 15, a wrist apparatus 1000 that is the wristwatch-type activity meter (active tracker) is provided on a site (subject) such as a wrist of a user with bands 1032, 1037, or the like, includes a display unit 150 for performing digital display, and is capable of performing wireless communication. The above-described physical quantity sensor 1 according to the invention is incorporated in the wrist apparatus 1000 as the sensor for measuring the angular velocity.

The wrist apparatus 1000 includes a case 1030 in which at least the physical quantity sensor 1 is accommodated, a processing unit 100 (refer to FIG. 16) that is accommodated in the case 1030 and processes output data from the physical quantity sensor 1, the display unit 150 that is accommodated in the case 1030, and a light-transmitting cover 1071 that covers an opening of the case 1030. A bezel 1078 is installed on an outer side of the light-transmitting cover 1071 of the case 1030. A plurality of operation buttons 1080 and 1081 are installed on a side surface of the case 1030. Hereinafter, the wrist apparatus will be further described in detail also with reference to FIG. 16.

The acceleration sensor 113 measures each of the accelerations in the three axis directions intersecting (ideally, perpendicular to) each other and outputs the signals (acceleration signals) depending on sizes and orientations of the three measured axis accelerations. The angular velocity sensor 114 as the physical quantity sensor 1 measures each of the angular velocities in the three axis directions intersecting (ideally, perpendicular to) each other and outputs the signals (angular velocity signals) depending on sizes and orientations of the measured three axis angular velocities.

On a liquid crystal display (LCD) constituting the display unit 150, the positional information obtained by using the GPS sensor 110 or a geomagnetic sensor 111, motion information such as a movement amount or momentum obtained by using an angular velocity sensor 114 included in the physical quantity sensor 1, a living body information such as a pulse rate obtained by using a pulse sensor 115, a time information such as a current time, or the like is displayed depending on a various types of measurement modes. It is possible to display an ambient temperatures obtained by using a temperature sensor 116.

A communication unit 170 performs various types control for establishing communication between a user terminal and an information terminal (not shown). For example, the communication unit 170 is configured to include a transceiver corresponding to a near field communication standard such as Bluetooth (registered trademark) (including Bluetooth low energy (BILE)), Wi-Fi (registered trademark) (wireless fidelity), Zigbee (registered trademark), near field communication (NFC), or ANT+ (registered trademark), or the communication unit 170 is configured to include a connector corresponding to a communication bus standard such as a universal serial bus (USB).

For example, the processing unit 100 (processor) is configured of a micro processing unit (MPU), a digital signal processor (DSP), an application specific integrated circuit (ASIC), or the like. The processing unit 100 executes various types of processing based on the program stored in the storage unit 140 and a signal input from an operation unit 120 (for example, the operation buttons 1080 and 1081). Examples of the processing performed by the processing unit 100 include data processing on each of the output signals from the GPS sensor 110, the geomagnetic sensor 111, a pressure sensor 112, the acceleration sensor 113, the angular velocity sensor 114, the pulse sensor 115, the temperature sensor 116, and a watch unit 130, display processing for displaying an image on the display unit 150, sound output processing for outputting sound to a sound output unit 160, communication processing for performing communication with the information terminal via the communication unit 170, electric power control processing for supplying electric power from a battery 180 to each of the units, or the like.

The wrist apparatus 1000 can have at least the following functions.

1. Distance: A total distance from a measurement start is measured by a highly accurate GPS function.

2. Pace: A current travel pace is displayed from pace distance measurement.

3. Average Speed: An average speed from a travel start to a current time is calculated and displayed.

4. Elevation: An elevation is measured and displayed by the GPS function.

5. Stride: A stride length is measured and displayed even in a tunnel where no GPS radio arrives.

6. Pitch: The number of steps per one minute is measured and displayed.

7. Heart Rate: A heart rate is measured and displayed by the pulse sensor.

8. Slope: A slope of the ground in training and trail running in a mountainous area is measured and displayed.

9. Auto-lap: Lap measurement is automatically performed when running by a certain distance and a certain time which are set in advance.

10. Exercise consumption calorie: Consumed calories are displayed.

11. Number of Steps: The total number of steps from an exercise start is displayed.

The wrist apparatus 1000 is widely applicable to a runner's watch for multi sports such as a running watch, a runner's watch, a duathlon and triathlon runner's watch, an outdoor watch, a GPS watch with a satellite positioning system, that is, a GPS, and the like.

In the above description, the description is provided by using the global positioning system (GPS) as the satellite positioning system; however, another global navigation satellite system (GNSS) may be used. For example, one or two or more of the satellite positioning systems such as a European geostationary satellite navigation overlay service (EGNOS), a Quasi-Zenith Satellite System (QZSS), a global navigation satellite system (GLONASS), GALILEO, or a BeiDou navigation satellite system (BeiDou) may be used. A satellite based augmentation system (SBAS) such as a wide area augmentation system (WAAS) or a European geostationary satellite navigation overlay service (EGNOS) may be used as at least one of the satellite positioning system.

Since the portable electronic apparatus includes the physical quantity sensor 1 and the processing unit 100, the portable electronic apparatus has good reliability.

Figure 17:
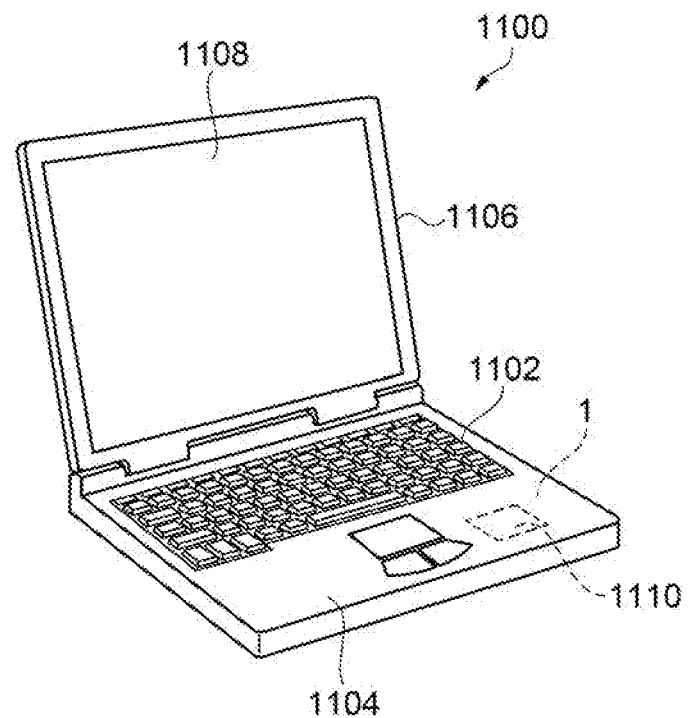
FIG. 17 is a perspective view schematically illustrating a configuration of a mobile personal computer which is an example of the electronic apparatus.

Next, a mobile personal computer 1100 as an example of the electronic apparatus, to which the physical quantity sensor 1 according to one embodiment of the invention is applied, will be described with reference to FIG. 17. FIG. 17 is a perspective view schematically illustrating a configuration of the mobile personal computer which is an example of the electronic apparatus.

In FIG. 17, the personal computer 1100 is configured to include a body unit 1104 including a keyboard 1102 and a display unit 1106 including a display unit 1108. The display unit 1106 is rotatably supported via a hinge structure unit with respect to the body unit 1104. The personal computer 1100 internally includes the physical quantity sensor 1 that functions as the angular velocity sensor. Thus, a control unit 1110 can perform control such as attitude control based on the measurement data of the physical quantity sensor 1.

Since the personal computer 1100 includes the physical quantity sensor 1 and the control unit 1110, the personal computer has good reliability.

Figure 18:
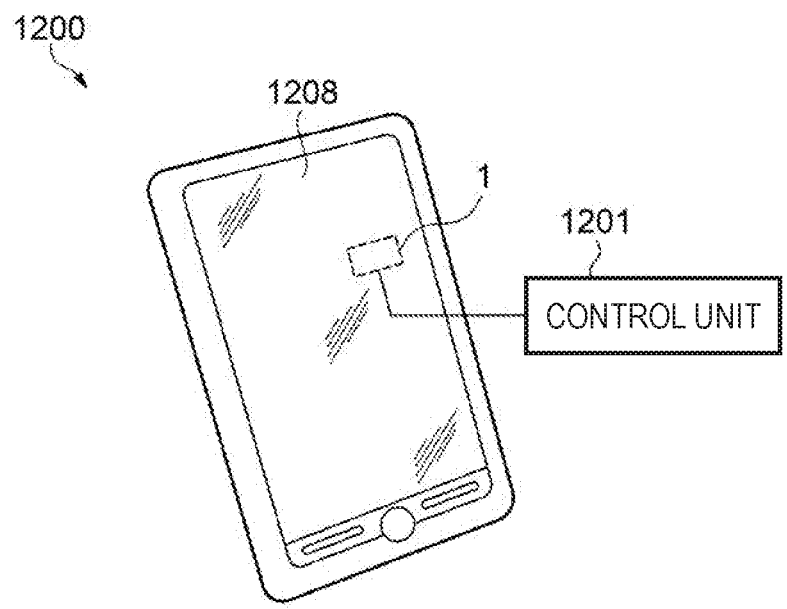
FIG. 18 is a perspective view schematically illustrating a configuration of a smartphone (mobile phone) which is an example of the electronic apparatus.

Next, a smartphone (mobile phone) 1200 that is an example of the electronic apparatus, to which the physical quantity sensor 1 according to one embodiment of the invention is applied, will be described with reference to FIG. 18. FIG. 18 is a perspective view schematically illustrating a configuration of the smartphone (mobile phone).

In FIG. 18, the smartphone 1200 includes the above-described physical quantity sensor 1. The measurement data (angular velocity data) measured by the physical quantity sensor 1 is transmitted to a control unit 1201 of the smartphone 1200. The control unit 1201 is configured to include a central processing unit (CPU) and is capable of recognizing attitude or behavior of the smartphone 1200 from the received measurement data so as to change a display image that is displayed on a display unit 1208 or to sound a warning sound or a sound effect and driving a drive motor so as to vibrate amain body. In other words, motion sensing of the smartphone 1200 is performed, and thus it is possible to change display content from the measured attitude or behavior or generate a sound, vibration, or the like. In particular, in a case where an application program of a game is executed, it is possible to have a realistic feeling close to reality.

Since the smartphone 1200 includes the physical quantity sensor 1 and the control unit 1201, the smartphone has good reliability.

Figure 19:
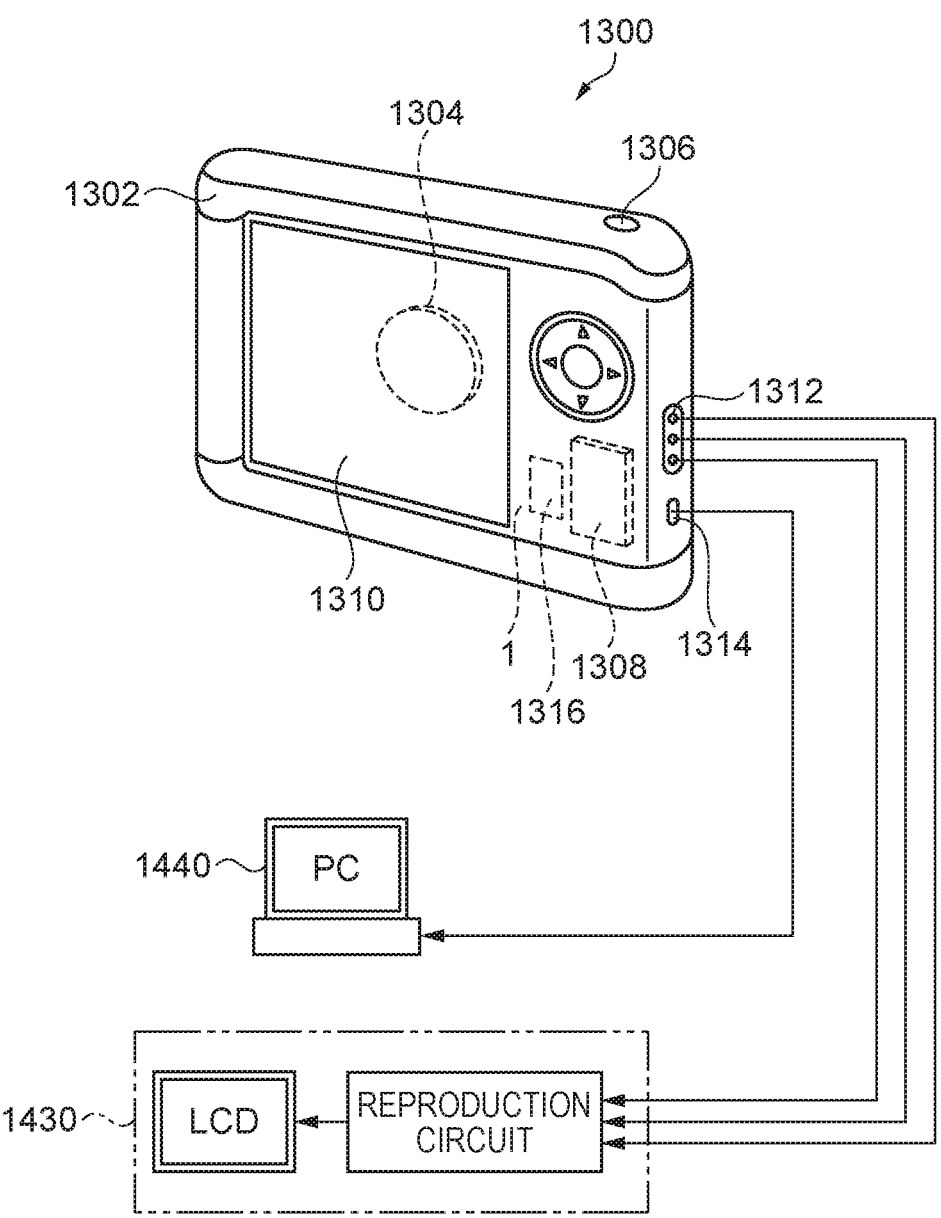
FIG. 19 is a perspective view illustrating a configuration of a digital still camera which is an example of the electronic apparatus.

Next, a digital still camera 1300 that is an example of the electronic apparatus, to which the physical quantity sensor 1 according to one embodiment of the invention is applied, will be described with reference to FIG. 19. FIG. 19 is a perspective view illustrating a configuration of the digital still camera. FIG. 19 also illustrates connection to an external apparatus in a simplified manner.

The digital still camera 1300 is provided with a display unit 1310 that is installed on a back surface of a case (body) 1302 and has a configuration in which a display is performed based on an imaging signal by the CCD, and the display unit 1310 functions as a finder that displays a subject as an electronic image. A light-receiving unit 1304 including an optical lens (an imaging optical system) or the CCD is installed on the front surface side (the rear surface side in FIG. 19) of the case 1302.

When a photographer checks an image of a subject displayed on the display unit 1310 and presses a shutter button 1306, an imaging signal of the CCD at the time point is transmitted to and stored in a memory 1308. In addition, in the digital still camera 1300, a video signal output terminal 1312 and an input/output terminal 1314 for data communication are installed on the side surface of the case 1302. As illustrated in FIG. 19, a television monitor 1430 is connected to the video signal output terminal 1312, and a personal computer 1440 is connected to the input/output terminal 1314 for data communication, as necessary. Further, the imaging signal stored in the memory 1308 is configured to be output to the television monitor 1430 or to the personal computer 1440 by a predetermined operation. The digital still camera 1300 internally includes the physical quantity sensor 1 that functions as the angular velocity sensor. Thus, a control unit 1316 can perform control such as correction of camera shake or the like based on the measurement data of the physical quantity sensor 1.

Since the digital still camera 1300 includes the physical quantity sensor 1 and the control unit 1316, the digital still camera has good reliability.

The electronic apparatus that includes the physical quantity sensor 1 can be applied to, in addition to the inertial measurement unit 2000 in FIG. 11, the vehicle positioning apparatus 3000 in FIG. 13, the portable electronic apparatus (wrist apparatus 1000) in FIG. 15, the personal computer 1100 in FIG. 17, the smartphone (mobile phone) 1200 in FIG. 18, and the digital still camera 1300 in FIG. 19, a tablet terminal, a timepiece, an ink jet type discharge apparatus (for example, an ink jet printer), a laptop personal computer, a TV, a video camera, a video tape recorder, a car navigation device, a pager, an electronic organizer (including a communicating function), an electronic dictionary, a calculator, an electronic game device, a word processor, a workstation, a TV phone, a security television monitor, electronic binoculars, a POS terminal, a medical apparatus (for example, an electronic thermometer, a sphygmomanometer, a blood glucose meter, an electrocardiogram measuring device, an ultrasonic diagnostic apparatus, or an electronic endoscope), a fishfinder, various measurement apparatuses, meters (for example, meters on a vehicle, an aircraft, or a ship), a flight simulator, a seismometer, a pedometer, an tiltmeter, or a vibration meter that measures vibration of a hard disk, an attitude control device of a flying object such as a robot or a drone, a control device that is used in inertial navigation for autonomous driving of an automobile, or the like.

Vehicle

Figure 20:
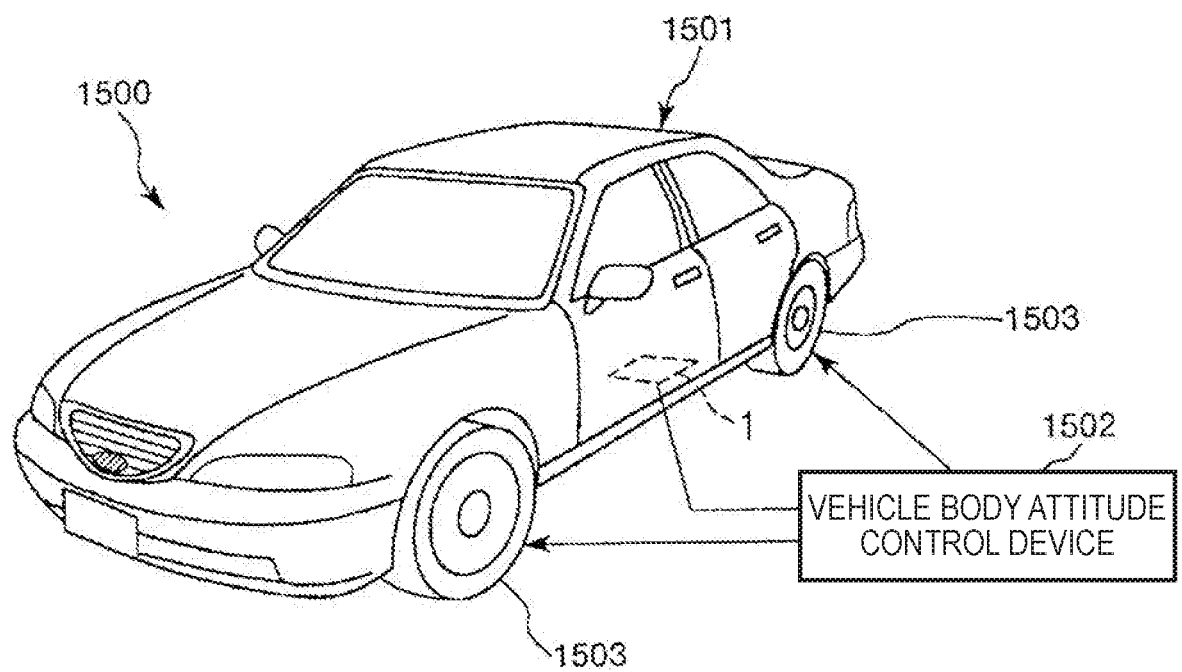
FIG. 20 is a perspective view illustrating a configuration of an automobile which is an example of a vehicle.

Next, an automobile 1500 that is an example of the vehicle, to which the physical quantity sensor 1 according to one embodiment of the invention is applied, will be described with reference to FIG. 20. FIG. 20 is a perspective view illustrating a configuration of the automobile.

As illustrated in FIG. 20, the automobile 1500 as the vehicle internally includes the physical quantity sensor 1. Thus, the physical quantity sensor 1 can detect an attitude of a vehicle body 1501. A detection signal of the physical quantity sensor 1 is supplied to a vehicle body attitude control device 1502 that controls the attitude of the vehicle as an attitude control unit. Then, the vehicle body attitude control device 1502 detects an attitude of the vehicle body 1501 based on the detection signal and is capable of controlling hardness or softness of a suspension in accordance with a detection result or individually controlling brakes of individual wheels 1503. The physical quantity sensor 1 can also be broadly applied to a keyless entry, an immobilizer, a car navigation system, a car air conditioner, an antilock brake system (ABS), an air bag, a tire pressure monitoring system (TPMS), an engine control, and an electronic control unit (ECU) such as a battery monitor of a hybrid automobile or an electric automobile.

The physical quantity sensor 1 that is applied to the vehicle can be used in attitude control of a biped walking robot or a train, attitude control of a remote control or autonomous aircraft such as an RC airplane, a radio control helicopter, and a drone, attitude control of an agricultural machinery or a construction machine, or control of a rocket, an artificial satellite, a ship, an automatic guided vehicle (AGV), a biped walking robot, and the like, in addition to the examples described above. As described above, the physical quantity sensor 1 and each of the control units (not illustrated) are incorporated in order to realize the attitude control of various types of vehicles.

Since the vehicle (automobile 1500) includes the physical quantity sensor 1 and the control unit (for example, a vehicle body attitude control device 1502 as the attitude control unit), the vehicle has good reliability.

As described above, the physical quantity sensors 1, 1a, 1b, and 1c, the electronic apparatuses (1000, 1100, 1200, 1300, 2000, and 3000), and the vehicle (1500) are described based on the illustrated embodiments, but the invention is not limited thereto. The configuration of each unit can be substituted with any configuration having the same function. Any other constituent may be added to the invention.

In the embodiment described above, the X axis, the Y axis, and the Z axis are perpendicular to each other; however, this is not limited thereto as long as the axes intersecting each other. For example, the X axis may be slightly inclined with respect to a normal direction to a YZ plane, the Y axis may be slightly inclined with respect to a normal direction to an XZ plane, and the Z axis may be slightly inclined with respect to a normal direction to an XY plane. Slightness means a range in which it is possible to exhibit the effects of the physical quantity sensors 1, 1a, 1b, and 1c, and a specific inclination angle (numerical value) varies depending on a configuration or the like.

What is claimed is:

1. A physical quantity sensor comprising:
a base unit provided with an open recess;
a movable unit that is provided in the open recess and is capable of displacing in a first direction by a spring unit that is unitary with the movable unit,
wherein a length of the spring unit in a second direction that intersects the first direction and in which the base unit overlaps the movable unit, is shorter than a length of the movable unit in the second direction and is longer than a length of the spring unit in the first direction.

2. The physical quantity sensor according to claim 1,
wherein a length between the spring unit and the base unit in the second direction is longer than a length between the movable unit and the base unit in the second direction.

3. The physical quantity sensor according to claim 2,
wherein a length between a surface of the spring unit on a side opposite to a surface of the spring unit on a side of the base unit and the base unit in the second direction is shorter than a length between a surface of the movable unit on a side opposite to a surface of the movable unit on a side of the base unit and the base unit in the second direction.

4. The physical quantity sensor according to claim 3,
wherein a length between a gravity center of the spring unit and the base unit in the second direction is equal to a length between a gravity center of the movable unit and the base unit in the second direction.

5. An electronic apparatus comprising:
a case; and
the physical quantity sensor according to claim 4 positioned within the case.

6. A vehicle comprising:
a vehicle body, and
the physical quantity sensor according to claim 4 positioned with the vehicle body.

7. An electronic apparatus comprising:
a case; and
the physical quantity sensor according to claim 3 positioned within the case.

8. A vehicle comprising:
a vehicle body; and
the physical quantity sensor according to claim 3 positioned with the vehicle body.

9. An electronic apparatus comprising:
a case; and
the physical quantity sensor according to claim 2 positioned within the case.

10. A vehicle comprising:
a vehicle body; and
the physical quantity sensor according to claim 2 positioned with the vehicle body.

11. The physical quantity sensor according to claim 1, wherein a length between a surface of the spring unit on a side opposite to a surface of the spring unit on a side of the base unit and the base unit in the second direction is shorter than a length between a surface of the movable unit on a side opposite to a surface of the movable unit on a side of the base unit and the base unit in the second direction.

12. The physical quantity sensor according to claim 11, wherein a length between a gravity center of the spring unit and the base unit in the second direction is equal to a length between a gravity center of the movable unit and the base unit in the second direction.

13. An electronic apparatus comprising:
a case; and
the physical quantity sensor according to claim 12 positioned within the case.

14. A vehicle comprising:
a vehicle body; and
the physical quantity sensor according to claim 12 positioned with the vehicle body.

15. An electronic apparatus comprising:
a case; and
the physical quantity sensor according to claim 11 positioned within the case.

16. A vehicle comprising:
a vehicle body; and
the physical quantity sensor according to claim 11 positioned within the vehicle body.

17. The physical quantity sensor according to claim 1, wherein a length between a surface of the spring unit on a side opposite to a surface of the spring unit on a side of the base unit and the base unit in the second direction is equal to a length between a surface of the movable unit on a side opposite to a surface of the movable unit on a side of the base unit and the base unit in the second direction.

18. The physical quantity sensor according to claim 1, wherein, in a part of the spring unit, the length of the spring unit in the second direction is shorter than the length of the movable unit in the second direction.

19. An electronic apparatus comprising:
a case; and
the physical quantity sensor according to claim 1 positioned within the case.

20. A vehicle comprising:
a vehicle body; and
the physical quantity sensor according to claim 1 positioned with the vehicle body.

* * * * *